United States Patent
Whitney et al.

(10) Patent No.: US 8,157,035 B2
(45) Date of Patent: Apr. 17, 2012

(54) HYBRID VEHICLE AUTO START SYSTEMS AND METHODS

(75) Inventors: Christopher E. Whitney, Highland, MI (US); Steven G. Bryde, Davisburg, MI (US); R. Travis Schwenke, Springboro, OH (US); John L. Lahti, Novi, MI (US); Ning Jin, Novi, MI (US); Birendra P. Bhattarai, Novi, MI (US); Cheryl A. Williams, Howell, MI (US); James B Nicholson, Albion, MI (US)

(73) Assignee: GM Global Technology Operations LLC

( * ) Notice: Subject to any disclaimer, the term of this patent is extended or adjusted under 35 U.S.C. 154(b) by 273 days.

(21) Appl. No.: 12/352,813

(22) Filed: Jan. 13, 2009

(65) Prior Publication Data

US 2010/0038158 A1 Feb. 18, 2010

Related U.S. Application Data

(60) Provisional application No. 61/089,153, filed on Aug. 15, 2008.

(51) Int. Cl.
*B60W 10/04* (2006.01)
(52) U.S. Cl. ............ 180/65.265; 180/65.28; 180/65.285
(58) Field of Classification Search ............ 180/65.265, 180/65.21–65.29
See application file for complete search history.

(56) References Cited

U.S. PATENT DOCUMENTS

| | | | | |
|---|---|---|---|---|
| 6,202,776 B1 * | 3/2001 | Masberg et al. | ............ | 180/65.22 |
| 6,315,693 B1 * | 11/2001 | Tayama | .......................... | 477/46 |
| 6,393,350 B1 * | 5/2002 | Light et al. | ...................... | 701/54 |
| 6,513,489 B2 * | 2/2003 | Osanai | ..................... | 123/339.11 |
| 6,857,987 B2 * | 2/2005 | Aldrich et al. | ................ | 477/110 |
| 7,024,859 B2 * | 4/2006 | Jayabalan et al. | .............. | 60/716 |
| 2004/0058778 A1 * | 3/2004 | Wheeler et al. | ................. | 477/71 |
| 2006/0218896 A1 * | 10/2006 | Ando et al. | ..................... | 60/277 |

* cited by examiner

*Primary Examiner* — J. Allen Shriver, II
*Assistant Examiner* — Erez Gurari

(57) ABSTRACT

A method of operating an engine control system includes reducing pressures within cylinders of an engine based on an auto start command signal including: receiving a torque request signal; calculating a powertrain output torque; and controlling air flow to the engine based on the powertrain output torque. During a startup of the engine: electric motor torque is increased to a predetermined level and reduced to increase a current speed of the engine; combustion torque of the engine is activated and increased after the current speed is within a predetermined range and a manifold absolute pressure is less than a predetermined level; and the electric motor torque is increased based on a crankshaft output torque signal to increase a crankshaft output torque subsequent to the reducing of the electric motor torque and while performing the activating of the combustion torque.

24 Claims, 14 Drawing Sheets

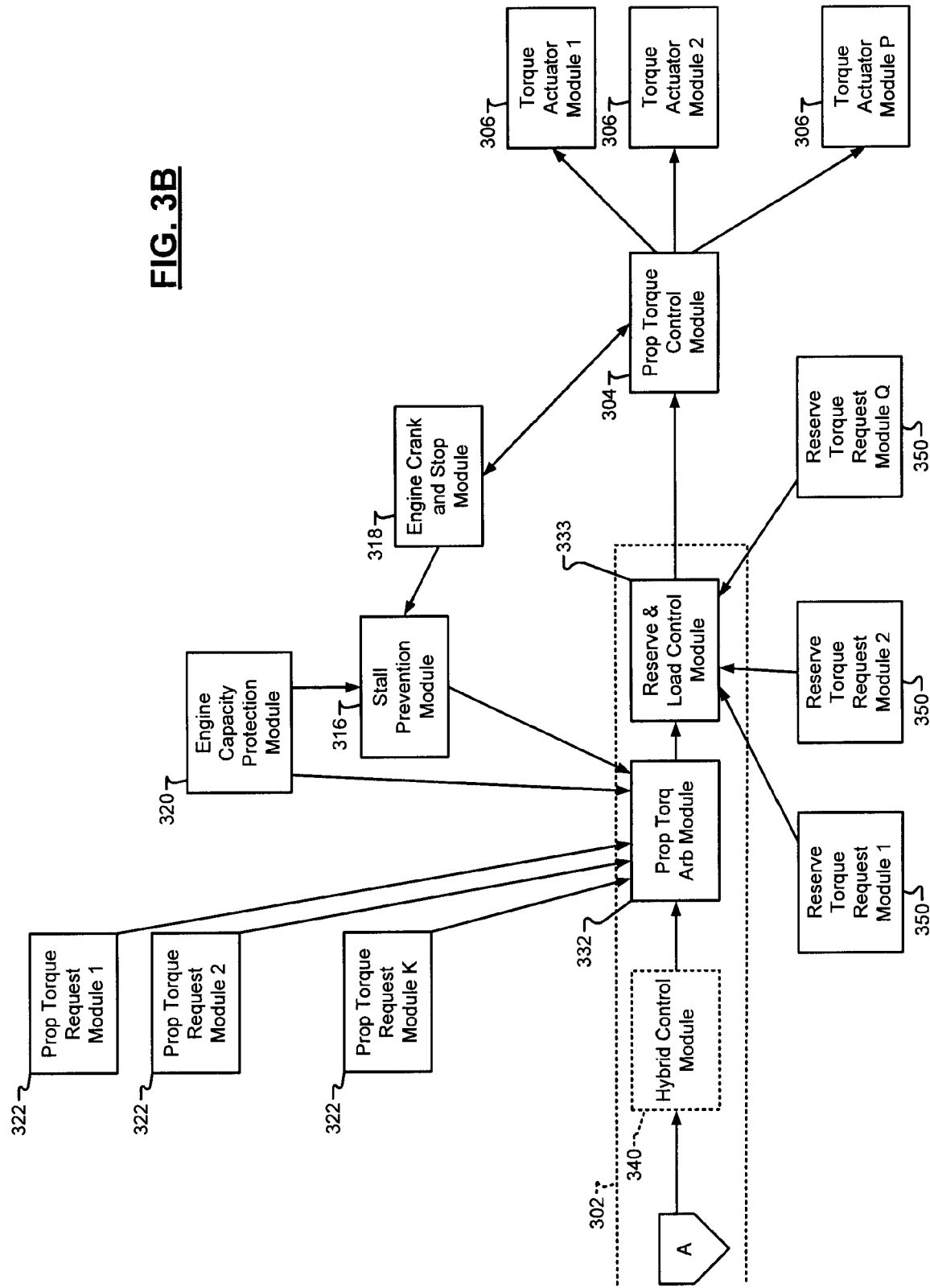

HYBRID VEHICLE AUTO START SYSTEMS AND METHODS

CROSS-REFERENCE TO RELATED APPLICATIONS

This application claims the benefit of U.S. Provisional Application No. 61/089,153, filed on Aug. 15, 2008. The disclosure of the above application is incorporated herein by reference in its entirety.

FIELD

The present disclosure relates to hybrid vehicle control systems and more particularly to auto start control.

BACKGROUND

The statements in this section merely provide background information related to the present disclosure and may not constitute prior art.

Hybrid powertrains typically include an internal combustion engine (ICE), one or more electric motors (EMs), and one or more torque generators that provide torque to a driveline to propel a vehicle. Hybrid powertrains types include a full hybrid powertrain, a strong hybrid powertrain, a mild hybrid powertrain, etc. In a full hybrid powertrain, an EM drives the drivetrain directly, without transferring torque through a component of the ICE. In a strong hybrid powertrain, one or more electric motors may be incorporated as part of a transmission system and be coupled between the ICE and the drivetrain. The electric motors may be used for transmission gear ratio selection, rotation assist, and braking of the ICE, regeneration, etc.

In a mild hybrid configuration the EM is coupled to the ICE through an accessory drive. Torque generated by the EM is transferred to the drivetrain through the ICE. An exemplary mild hybrid powertrain may include a belt alternator starter (BAS) system. In the BAS system, the EM is connected to the ICE via a belt and pulley configuration, which drives other accessory components, such as pumps and compressors.

Powertrain torque control typically includes two torque control domains: axle torque and propulsion torque. In a mild hybrid powertrain, the propulsion torque is the output torque at the crankshaft of the ICE, which includes the EM torque contribution.

During an auto start of the engine a control module of a hybrid powertrain spins up the engine using the electric motor. An auto start, for example, may occur when a vehicle is active (a key start or the like has already occurred) and not moving, such as when a vehicle operator lets off a brake pedal and/or depresses an accelerator pedal. A crankshaft of the engine is typically rotated at higher speeds during an auto start than during a conventional startup of an engine via a starter. During an auto start, surges in engine speed and/or output torque of the hybrid powertrain may be experienced due to the activation of the ICE.

SUMMARY

In one embodiment, a control system for an engine is provided and includes an engine control module (ECM) that operates in a first mode and a second mode. The ECM generates an idle speed signal and a transmission load signal that is based on an idle speed of the engine. The hybrid control module (HCM) increases electric motor torque to increase a current speed of the engine based on the idle speed signal and the transmission load signal. The HCM controls the current speed when in the first mode. The ECM controls the current speed when in the second mode. The HCM transfers control of the current speed to the ECM when at least one of the current speed matches the idle speed and a combustion torque output of the engine is equal to a requested crankshaft output torque.

In other features, a method of operating an engine control system is provided and includes receiving an auto start command signal. Pressures within cylinders of an engine are reduced based on the auto start command signal. A torque request signal is received corresponding to at least one of spark and fuel. A powertrain output torque is calculated based on engine air flow commands of an engine control module. Air flow is controlled to the engine based on the powertrain output torque. Electric motor torque is increased to a predetermined level to overcome friction and pumping pressures of the engine. Electric motor torque is reduced to ramp up a current speed of the engine and to engage a transmission. Combustion torque of the engine is activated and increased after the current speed of the engine is within a predetermined range of an idle speed and after a manifold absolute pressure of the engine is less than a first predetermined level.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3B is a functional block diagram of a second portion of the coordinated torque control system of FIG. 3B;

DETAILED DESCRIPTION

Figure 1:
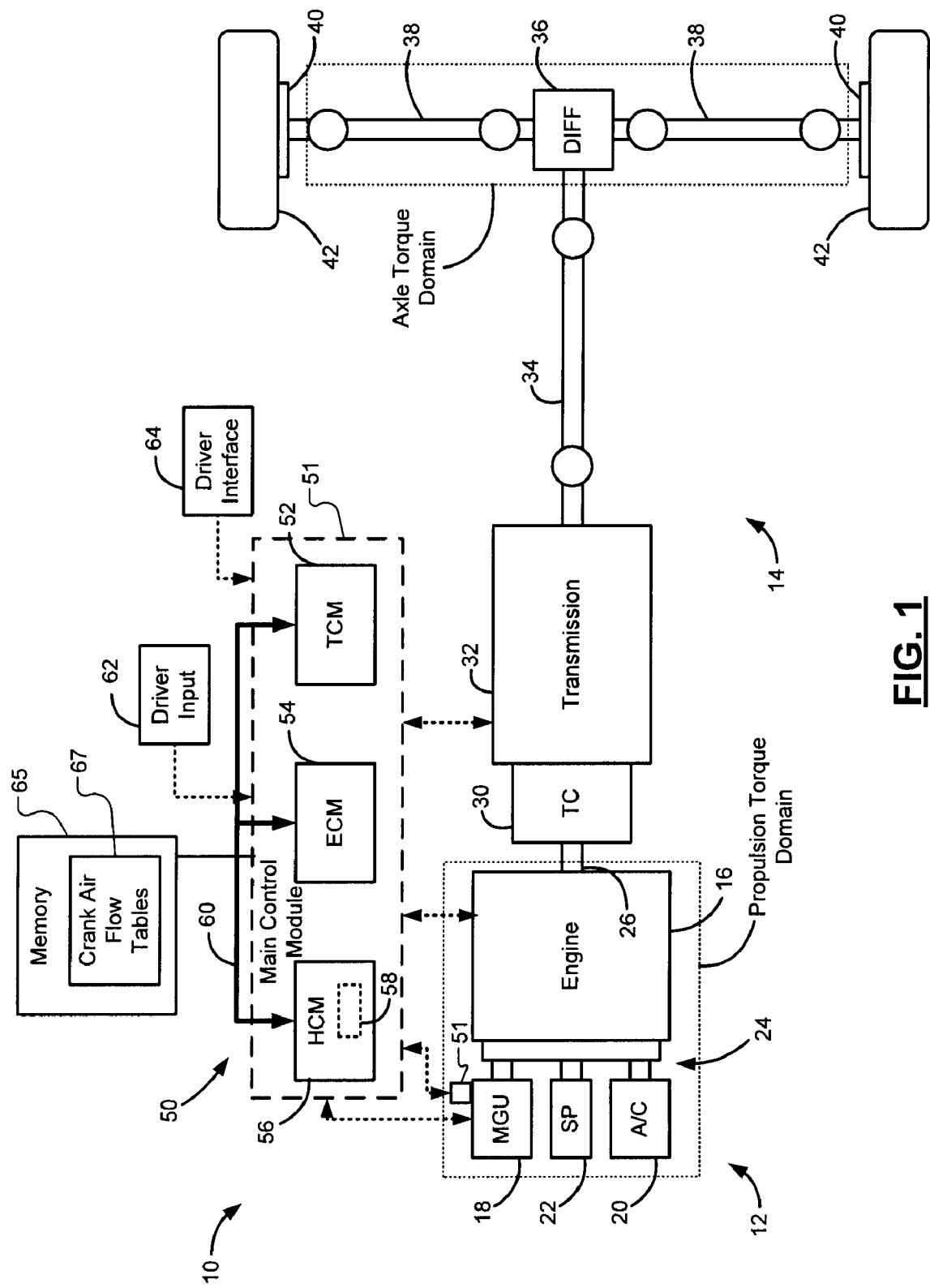
FIG. 1 is a functional block diagram of a hybrid powertrain system incorporating auto start control in accordance with an embodiment of the present disclosure.

A hybrid vehicle control system may include a hybrid control module and an engine control module. During an auto start, the hybrid control module may increase or spin up the speed of an internal combustion engine (ICE) to an idle speed using an electric motor (EM). During an auto start, surges in engine speed and/or output torque may be experienced in a hybrid vehicle.

To control engine speed during an auto start, the hybrid control module may use speed ramping profiles, inertia and engine torque control techniques. The engine torque techniques may include the closing of a throttle, reducing the amount of fuel supplied to cylinders, and the retarding of spark. Although these techniques help to reduce surges in engine speed, the techniques have limited results and have associated disadvantages. For example, after the retarding of spark exceeds a certain level, misfiring can result. Also, these engine torque techniques are limited in their ability to control air flow into the ICE.

The following described embodiments satisfy several startability characteristics including providing a smooth increase in engine speed during an auto start without surges in engine speed and/or output torque. The engine speed may be increased to an idle engine speed and provided within a predetermined time period. The smooth increase in engine speed is provided while transitioning engine speed control between hybrid control and engine control modules. The auto start control is based on torque domain control and not actuator domain control.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

Furthermore, in the following description the term auto start refers to the startup of an engine by a control module via an EM without driver initiation through a start request mechanism such as a key switch or a push button switch. An auto start does not refer to a change in an ignition state. In a hybrid vehicle an engine may be depowered/deactivated during different situations, such as during low-power demand periods, etc. For example only, an auto start may occur after a vehicle has approached and stopped at a red traffic light and the engine has been shut down or deactivated. When a brake pedal of the vehicle is not depressed and/or when an accelerator pedal of the vehicle is depressed, an auto start may be initiated.

During an auto start, an EM spins-up an engine at increased speeds over that commonly associated with a conventional starter. The EM provides a smoother and less fuel consuming start of the engine than starts performed using a starter. An electric motor auto start allows for variable torque control while overcoming compression pulses of an engine. An electric motor auto start also allows for a controlled increase in engine speed to a level that permits a reduction (suck down) in manifold pressure. In spinning-up the engine, the EM may provide different levels of torque. This torque may be applied before fuel injection to the engine is enabled and before manifold absolute pressure of the engine is less than a predetermined manifold absolute pressure.

Also, various modes of operation are described. A first driver induced mode or normal mode may refer to a vehicle operator induced auto start. The normal mode also corresponds to when an accelerator is not actuated or when accelerator actuation is less than a predetermined level. A first non-driver induced or backup mode may refer to an auto start that is system induced, as opposed to vehicle operator induced. The backup mode may occur when, for example only, a vehicle is not moving, the ICE is operating at an idle speed and an increase in torque output is requested. An increase in torque output may be due to a command to charge a power supply or batteries, to operate air conditioning, etc.

The normal mode and the backup mode provide a smooth ramping up and start of an ICE without producing a surge in engine speed or an overshoot in engine speed relative to an idle engine speed. This ramp up in engine speed is provided with EM control, with a turn ON of engine combustion torque, and a handoff of engine speed control between control modules, and with minimal flares or sags in engine speed.

A second driver induced or aggressive mode may refer to a driver induced auto start and when accelerator actuation is greater than or equal to the predetermined level. During the aggressive mode, a smooth ramp of ICE speed is provided with an appropriate output torque to satisfy the vehicle operator torque output request. The aggressive mode may correspond to when the driver tips-in (depresses or actuates an accelerator from a default position) before a handoff in engine speed control is performed. The ICE speed is ramped up to engage a transmission before fully responding to the driver torque request. This prevents ICE speed from increasing abruptly, which can result in a clunk felt by the driver. After engaging the transmission, system response time is minimized to provide the torque requested.

Referring now to FIG. 1, an exemplary hybrid powertrain system 10 incorporating auto start control is shown. Although the powertrain system 10 is illustrated as a rear wheel drive (RWD) powertrain, it is appreciated that the embodiments of the present disclosure can be implemented with any other powertrain configuration. The powertrain system 10 includes a propulsion system 12 and a drivetrain system 14. The propulsion system 12 includes an internal combustion engine (ICE) 16 and an EM or a motor generator unit (MGU) 18. The propulsion system 12 can also include auxiliary components including, but not limited to, an A/C compressor 20 and a steering pump 22. The MGU 18 and the auxiliary components are coupled to the ICE 16 using a belt and pulley system 24. The belt and pulley system 24 may be coupled to a crankshaft 26 of the ICE 16 and enable torque to be transferred between the crankshaft 26 and the MGU 18 and/or the auxiliary components. This configuration is referred to as a belt alternator starter (BAS) system.

The crankshaft 26 drives the drivetrain system 14. The drivetrain system 14 includes a flexplate or flywheel (not shown), a torque converter or other coupling device 30, a transmission 32, a propeller shaft 34, a differential 36, axle shafts 38, brakes 40 and driven wheels 42. A propulsion torque ($T_{PROP}$) that is output at the crankshaft 26 of the ICE 16 is transferred through the drivetrain system components to provide an axle torque ($T_{AXLE}$) at the axle shafts 38 to drive the wheels 42. The axle torque $T_{AXLE}$ may be referred to as the powertrain output torque. More specifically, $T_{PROP}$ is multiplied by several gear ratios provided by the coupling device 30, the transmission 32 and the differential 36 to provide $T_{AXLE}$ at the axle shafts 38. Essentially, $T_{PROP}$ is multiplied by an effective gear ratio, which is a function of a ratio introduced by the coupling device 30, a transmission gear ratio determined by transmission input/output shaft speeds, a differential ratio, as well as any other component that may introduce a ratio in the drivetrain system 14 (e.g., a transfer case in a four wheel drive (4 WD) or all wheel drive (AWD) powertrain). For the purposes of torque control, the $T_{AXLE}$ domain includes the ICE 16 and the MGU 18.

The powertrain 10 also includes a control system 50, which regulates torque output of the MGU 18 during auto starts of the engine 16. The control system 50 includes a main control module 51 that may include a transmission control module (TCM) 52, an engine control module (ECM) 54 and a hybrid control module (HCM) 56. The control system 50 may regulate the torque output of the MGU 18 based on speed of the MGU 18, which may be detected by a speed sensor 51. The information from the speed sensor 51 may be provided directly to the HCM 56. This allows for quick detection of the speed of the MGU 18 and adjustment of the output torque of the MGU 18. The output torque may be applied to a crankshaft of the engine 16.

The main control module 51 controls powertrain output torque generated via the TCM 52, ECM 54 and HCM 56. The HCM 56 can include one or more sub-modules including, but not limited to, a BAS control processor (BCP) 58. The TCM 52, ECM 54 and HCM 56 communicate with one another via a controller area network (CAN) bus 60. A driver input 62 communicates with the ECM. The driver input 62 can include, but is not limited to, an accelerator pedal and/or a cruise control system. A driver interface 64 communicates with the TCM 52. The driver interface 64 includes, but is not limited to, a transmission range selector (e.g., a PRNDL lever). The main control module 51 may communicate with memory 65 that includes crank air flow tables 67.

The control system 50 may operate based on coordinated torque control which may include an axle torque domain and a propulsion torque domain. $T_{PROP}$ is the crankshaft output torque, which may include the EM torque contribution. The coordinated torque control according to the present disclosure implements axle torque ($T_{AXLE}$) arbitration in the ECM to provide an arbitrated axle torque ($T_{AXLEARB}$).

The coordinated torque control may monitor the accelerator pedal position ($\alpha_{PED}$) and the vehicle speed ($V_{VEH}$). A driver intended or desired axle torque ($T_{AXLEDES}$) or engine power is determined based on $\alpha_{PED}$ and $V_{VEH}$. Engine power may be used for BAS hybrid systems or non-hybrid vehicle systems. Axle torque may be used for strong hybrid systems. For example, $\alpha_{PED}$ and $V_{VEH}$ can be used as inputs to pre-calibrated, pre-stored look-up table, which provides a corresponding $T_{AXLEDES}$. The ECM 54 arbitrates $T_{AXLEDES}$ and other torque requests to provide $T_{AXLEARB}$. The other torque requests include one or more torque requests provided in an axle torque request set. The torque requests are generated by a torque feature and include, but are not limited to, an absolute torque value, a minimum torque limit value, a maximum torque limit value or a delta torque value request. The torque features associated with the axle torque request set include, but are not limited to, a traction control system (TCS), a vehicle stability enhancement system (VSES) and a vehicle overspeed protection system (VOS). Upon determining $T_{AXLEARB}$, $T_{AXLEARB}$ is converted into a propulsion torque ($T_{PROPECM}$) within the ECM 54 using the effective gear ratio. After having determined $T_{PROPECM}$, the ECM 54 arbitrates $T_{PROPECM}$ and other propulsion torque requests to provide a final $T_{PROPECM}$ to the HCM 56.

The HCM 56 may issue a torque request to set the engine combustion torque output to zero by deactivating the engine cylinders (e.g., by shutting-off the fuel to the cylinders). This can occur during vehicle coast down situations when the desired propulsion system torque is negative. An example of this is when the accelerator pedal position is near or at a zero level to decelerate the vehicle. For example, the fuel is shut-off and the regenerative braking of the vehicle commences to transfer the kinetic energy of the vehicle into electric power via the MGU 18. To facilitate this, a torque converter clutch that links the wheel torque to the crankshaft is engaged. Through this, the MGU 18 is driven. Accordingly, torque requests may be provided to the ECM 54, such as to a driver torque request module of the ECM 54, from the HCM 56. The torque requests may include the driver/cruise (axle torque arbitrated) propulsion torque request and an HCM 56 zero fuel torque request.

The TCM 52 provides an arbitrated propulsion torque value ($T_{PROPTCM}$). More specifically, the TCM 52 arbitrates torque requests from torque features. An exemplary TCM torque feature is a transmission protection algorithm that generates a maximum torque limit to limit the torque at the transmission input shaft. The maximum torque limit indicates the maximum allowable torque through the transmission input shaft in order to protect transmission components.

The ECM arbitrates TCM torque requests and determines a final torque request that is sent to the HCM 56. The TCM torque requests are non-actuator specific and may be provided to axle or propulsion torque arbitration modules of the ECM 54. The term non-actuator specific refers engine based actuators, such as actuators associated with air flow, spark and fuel or other non-engine based actuators that may be used to provide the requested torque.

The HCM 56 determines $T_{ICE}$ and $T_{EM}$ based on $T_{PROPFINAL}$. More specifically, the HCM 56 includes an optimization algorithm, which partitions $T_{PROPFINAL}$ based on the available torque output of each of the ICE 16 and the MGU 18. $T_{ICE}$ is sent to the ECM 54, which generates control signals for achieving $T_{ICE}$ using the ICE 16. The HCM 56 generates control signals based on $T_{EM}$ for achieving $T_{EM}$ using the MGU 18.

Figure 2:
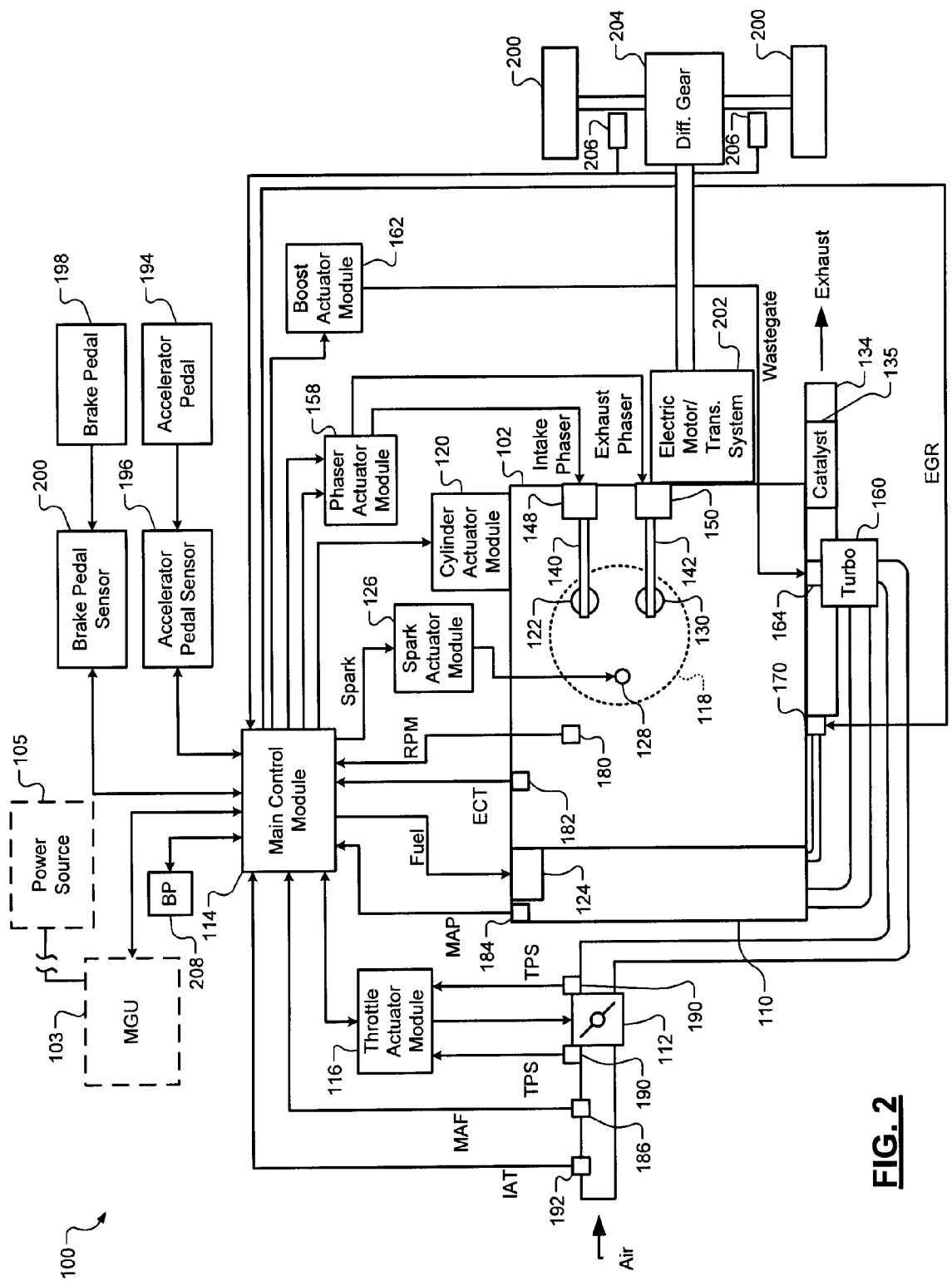
FIG. 2 is a functional block diagram of another hybrid powertrain system incorporating auto start control in accordance with an embodiment of the present disclosure.

Referring now to FIG. 2, a functional block diagram of an engine system 100 is presented. The engine system 100 may be configured for a hybrid electric vehicle. The engine system 100 includes an engine 102 that combusts an air/fuel mixture to produce drive torque for a vehicle and a MGU 103, which may be connected to or communicate with a power source 105. The power source may include one or more batteries. Air is drawn into an intake manifold 110 through a throttle valve 112. A main control module 114 commands a throttle actuator module 116 to regulate opening of the throttle valve 112 to control the amount of air drawn into the intake manifold 110.

Air from the intake manifold 110 is drawn into cylinders of the engine 102. The engine 102 may include any number of cylinders. The main control module 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the main control module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through a catalyst 135.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 2 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The main control module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The main control module 114 may communicate with a transmission control module 194 to coordinate shifting gears in a transmission (not shown). For example, the main control module 114 may reduce torque during a gear shift. The main control module 114 may communicate with a hybrid control module 196 to coordinate operation of the engine 102 and the MGU 103. The MGU 103 may be used to produce electrical energy for use by vehicle electrical systems and/or for storage in a battery. In various implementations, the main control module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as a torque actuator, while the corresponding actuator position is amount of spark advance. Other torque actuators include the boost actuator module 162, the EGR valve 170, the phaser actuator module 158, the fuel injection system 124, and the cylinder actuator module 120. The term actuator position with respect to these torque actuators may correspond to boost pressure, EGR valve opening, intake and exhaust cam phaser angles, air/fuel ratio, and number of cylinders activated, respectively. The above torque actuators are engine specific. Other torque actuators may be included and associated with, for example, the MGU 103.

While MGU 103 may provide EM torque in series and/or in parallel with the torque output of engine 102, it should be appreciated that other configurations are also contemplated to be within the scope of this description. For example, the MGU 103 may be implemented as one or more EMs and provides torque directly to wheels 200 instead of passing through an EM transmission system 202.

The combined torque of the engine 102 and the MGU 103 is applied to an input of transmission 202. The EM transmission system 202 may include an automatic transmission that switches gears in accordance with a gear change command from the main control module 114. The EM transmission system 202 may include one or more EMs for gear ratio selection, rotation assist, engine braking, regeneration, etc. An output shaft of the EM transmission system 202 is coupled to an input of a differential gear 204. Differential gear 204 drives axles and wheels 200. Wheel speed sensors 206 generate signals that indicate a rotation speed of their respective wheels 200.

The engine system 100 may further include a barometric pressure sensor 208. The barometric pressure sensor 208 may be used to determine environmental conditions, which may be further used to determine a desired throttle area. The desired throttle area may correspond to a specific throttle position.

Figure 3A:
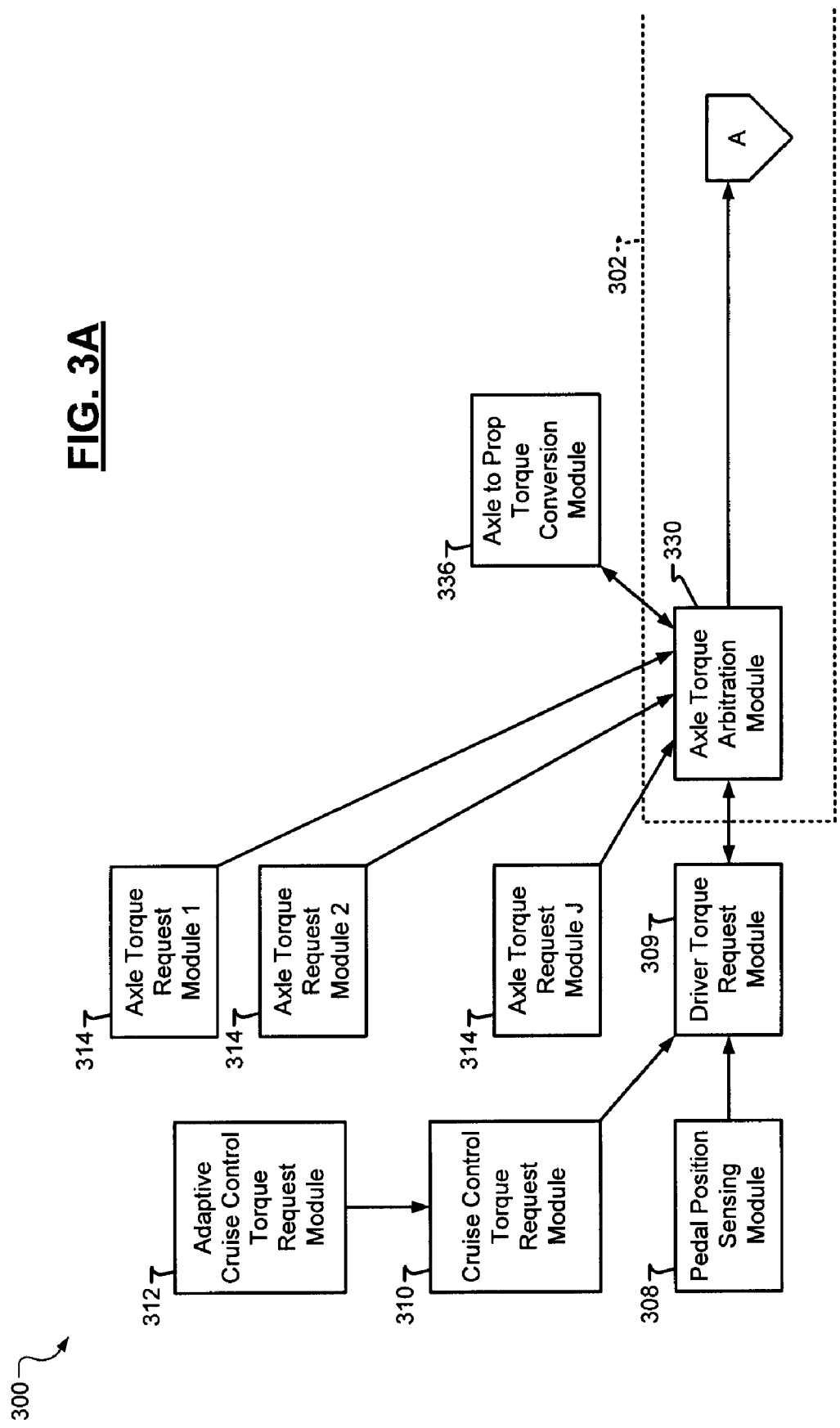
FIG. 3A is a functional block diagram of a first portion of a coordinated torque control system in accordance with an embodiment of the present disclosure.

Referring now to FIGS. 3A and 3B, an exemplary engine control system 300 that provides coordinated torque control is shown. The engine control system 300 may be referred to as a CTC system or backbone. Any of the modules of the engine control system 300 may perform a diagnostic test and thus be referred to as a dedicated diagnostic module. FIGS. 3A and 3B join together to depict the complete functional block diagram. A first connector label "A" on FIG. 3A overlays a second connector label "A" on FIG. 3B. FIGS. 3A and 3B are collectively referred to as FIG. 3.

The engine control system 300 employs a torque request backbone module 302 that determines a propulsion torque demand and communicates the propulsion torque demand to a propulsion torque control module 304. Torque request backbone module 302 determines the propulsion torque demand based on inputs from various torque requesting modules 308-322 that are described below in more detail. The torque requesting modules 308-322 include modules that generate signals to affect the control of one or more of actuators $306_{1-P}$ (i.e. actuators 306), which alter engine torque. The propulsion torque demand represents the torque desired from an engine in order to satisfy requests from the torque requesting modules 308-322.

The propulsion torque control module 304 controls one or more of the actuators 306 based on the net propulsion torque demand. Actuators 306 affect the engine torque. Examples of the actuators 306 include: an ignition module that delivers an ignition spark to the engine according to set ignition timing; a fuel injection module that delivers an appropriate amount of fuel to the engine at a set time; and an electronic throttle control module that adjusts, for example, a throttle valve angle.

Each of the torque requesting modules 308-322 may be categorized as either an axle torque requesting module or a propulsion torque requesting module. Axle torque requesting modules control at least one of vehicle speed and vehicle traction with the road surface. Propulsion torque requesting modules control the output torque of the engine, an EM, a MGU, a combined EM and MGU, and/or a combination thereof. Example axle torque requesting modules are shown in FIG. 3A and include a pedal position sensing module 308, a driver torque request module 309, a cruise control torque request module 310, an adaptive cruise control torque request control module 312, and other axle toque request modules $314_{1-J}$. Example propulsion torque requesting modules 304 are shown in FIG. 3B and include a stall prevention module 316, an engine crank and stop module 318, an engine capacity protection module 320, and other propulsion torque request modules$_{1-K}$.

The pedal position sensing module 308 generates a pedal position signal that indicates a vehicle acceleration requested by a vehicle operator. The driver torque request module 309 generates a driver torque request based on the pedal position signal. The driver torque request may also be based on a current engine speed and a current vehicle speed.

The cruise control torque request module 310 generates a cruise control torque request. The cruise control torque request represents an axle torque to maintain the vehicle at a set speed. The adaptive cruise control torque request module 312 may communicate with cruise control torque request module 310 to modify the cruise control torque request based on the environment surrounding the vehicle. For example, adaptive cruise control torque request module 312 may request a reduced axle torque. This request may be to decelerate the vehicle and/or maintain the vehicle at a minimum following distance behind a second vehicle while the cruise control is active.

Other axle torque requesting modules are represented by axle torque request modules $314_{1-J}$ are referred to collectively as axle torque request modules 314. A first example of an axle torque request module 314 is a traction/drag control module. The traction/drag control module determines axle torque changes to control positive wheel slip and negative wheel slip. Positive wheel slip refers to slip between a vehicle tire and a road surface due to excessive powertrain torque during acceleration. Negative wheel slip refers to slip between the vehicle tire and the road surface due to excessive braking axle torque during deceleration. The slip can be detected based on signals from wheel speed sensors.

Another example of an axle torque request module 314 is a vehicle over-speed protection module. The vehicle over-speed protection module determines a maximum axle torque limit to maintain vehicle speed below a predetermined speed limit.

Still another example of an axle torque request module 314 is a brake torque management module. The brake torque management module determines a maximum axle torque when vehicle brakes are applied. The maximum axle torque is the axle torque that can be provided without overcoming the brake torque of the vehicle brakes.

Yet another example of an axle torque request module 314 is a stability control module. The stability control module generates axle torque requests based on a yaw rate of the vehicle. A stability control module may be included in an electronic stability control system.

The torque request backbone module 302 includes an axle torque arbitration module 330, and a propulsion torque arbitration module 332, and a reserve and load control module 333. The axle torque arbitration module 330 receives the various torque requests and/or limits from driver torque request module 309, cruise control torque request module 310, axle torque request modules 314.

The axle torque arbitration module 330 generates a net axle torque request based on the torque requests and/or limits and communicates the net axle torque request to an axle-to-propulsion torque conversion module 336. Axle-to-propulsion torque conversion module 336 converts the net axle torque request to a corresponding propulsion torque request, which may be provided to the propulsion torque arbitration module 332. The conversion may be based on a gear ratio of an axle differential gear, a diameter of a vehicle wheel, a gear ratio of a transmission, and a torque converter gain.

In a strong hybrid electric vehicle, the total axle torque request from the axle torque arbitration module 330 is communicated to a hybrid control module 340. The hybrid control module 340 may determine the amounts of propulsion torque to be provided by an EM or MGU and an engine. The hybrid control module 340 generates propulsion torque requests signals based on the determination, which are provided respectively to the propulsion torque arbitration module 332 and the MGU. The axle to propulsion torque conversion module 336 may be combined with the hybrid control module 340.

The propulsion torque arbitration module 332 generates arbitrated predicted and immediate propulsion torque signals that are based on the propulsion torque requests and/or limits from the various propulsion torque request modules, the axle torque arbitration module 330, and/or the HCM 340. The propulsion torque arbitration module 332 communicates the arbitrated predicted and immediate propulsion torques to the reserves and load control module 333, which communicates predicted and immediate torque requests to the propulsion torque control module 304 based on reserve torque requests from reserve torque request modules $350_{1-Q}$. The propulsion torque arbitration module 332 receives propulsion torque requests from the propulsion torque request modules 316-322. The propulsion torque request modules $322_{1-K}$ are referred to collectively as propulsion torque request modules 322.

The reserve and load control module 333 may receive reserve torque requests from one or more of the reserve torque request modules $350_{1-Q}$ (referred to collectively as reserve torque request modules 350). Reserve additional torque that may be provided from an engine. A first example of a reserve torque request module 350 is an air conditioning compressor torque compensation module. The air conditioning compressor torque compensation module requests a reserve and load torque offset pair to maintain a constant engine speed when a compressor clutch engages and disengages.

Another example of a reserve torque request module 350 is a catalyst light-off module. When an engine is started and has a temperature that is less than a certain temperature, the catalyst light-off module requests engine spark to be retarded to increase exhaust gas temperature and heat an exhaust catalyst to a conversion temperature. The catalyst light-off module may also request that a throttle opening be increased while the spark is retarded to compensate for any associated torque loss.

Another example of a reserve torque request module 350 is an intrusive diagnostic module. An intrusive diagnostic module, such as an idle catalyst monitor, may change an air/fuel ratio of an engine to perform a diagnostic test. This change in the air/fuel ratio may alter torque output of an engine. The intrusive diagnostic module may request a reserve torque to compensate for this change in torque output.

The stall prevention module 316 determines a minimum torque needed to maintain the engine in a running state. The stall prevention module 316 may increase the minimum torque based on input from the engine crank and stop module 318 and the engine capacity protection module 320.

The engine capacity protection module 320 provides a maximum torque limit for an engine based on mechanical limitations of the propulsion system (engine). Example mechanical limitations include a maximum torque limit associated with mechanical parts of an engine, such as a crankshaft, pistons, etc. A transmission maximum torque limit may be provided with a transmission maximum torque request from a TCM, such as the TCM 52 of FIG. 1. The engine capacity protection module 320 also provides minimum and maximum torque limits for proper combination. A minimum torque example is a torque that can be achieved with air actuation before a misfire results. The minimum and maximum limits may be provided to the propulsion torque arbitration module 332 for use in generation of the total requested propulsion torque.

An example of a propulsion torque request module 322 is a transmission torque request module that generates a torque request to reduce engine torque during transmission shifts. Other propulsion torque request modules 322 may include an engine over-speed protection module and an engine idle speed control module. The engine over-speed protection module determines a propulsion torque limit to prevent engine speed from exceeding a predetermined engine speed. The engine idle speed control module determines the propulsion torque needed to maintain an engine at a predetermined idle speed during coasting or at idle with a transmission in a drive or neutral gear. Yet further propulsion torque request modules 322 may include a fuel cutoff module. The fuel cutoff module provides a clutch fuel cutoff that may occur when the vehicle is equipped with a manual transmission and the vehicle operator disengages the clutch. The clutch fuel cutoff prevents the engine speed from increasing beyond a predetermined speed when the clutch disengages and removes a load from the engine.

A strong hybrid powertrain system typically includes a hybrid control module that controls engine speed. In the following disclosed embodiments, a hybrid control module and an engine control module are disclosed that each control engine speed at different times. In one embodiment, the HCM and the ECM do not control engine speed at the same time. The HCM and the ECM have different corresponding engine speed control techniques, algorithms, etc. The transitioning of engine speed control and the use of coordinated torque control allows the embodiments disclosed herein to apply to different hybrid powertrain control systems including full, strong and mild hybrid powertrain control systems.

Figure 4:
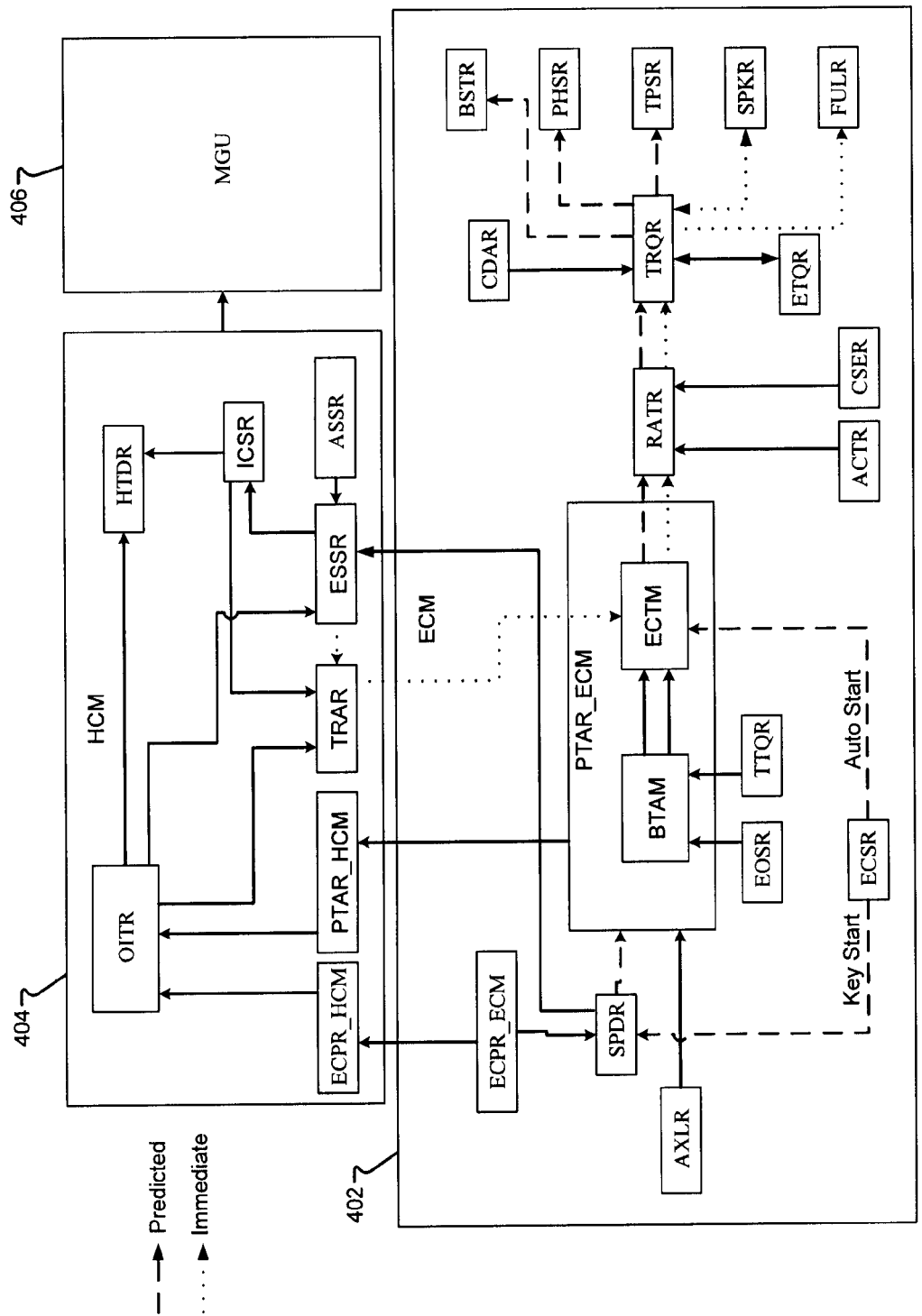
FIG. 4 is a functional block diagram of a control system in accordance with an embodiment of the present disclosure.
Figure 13:
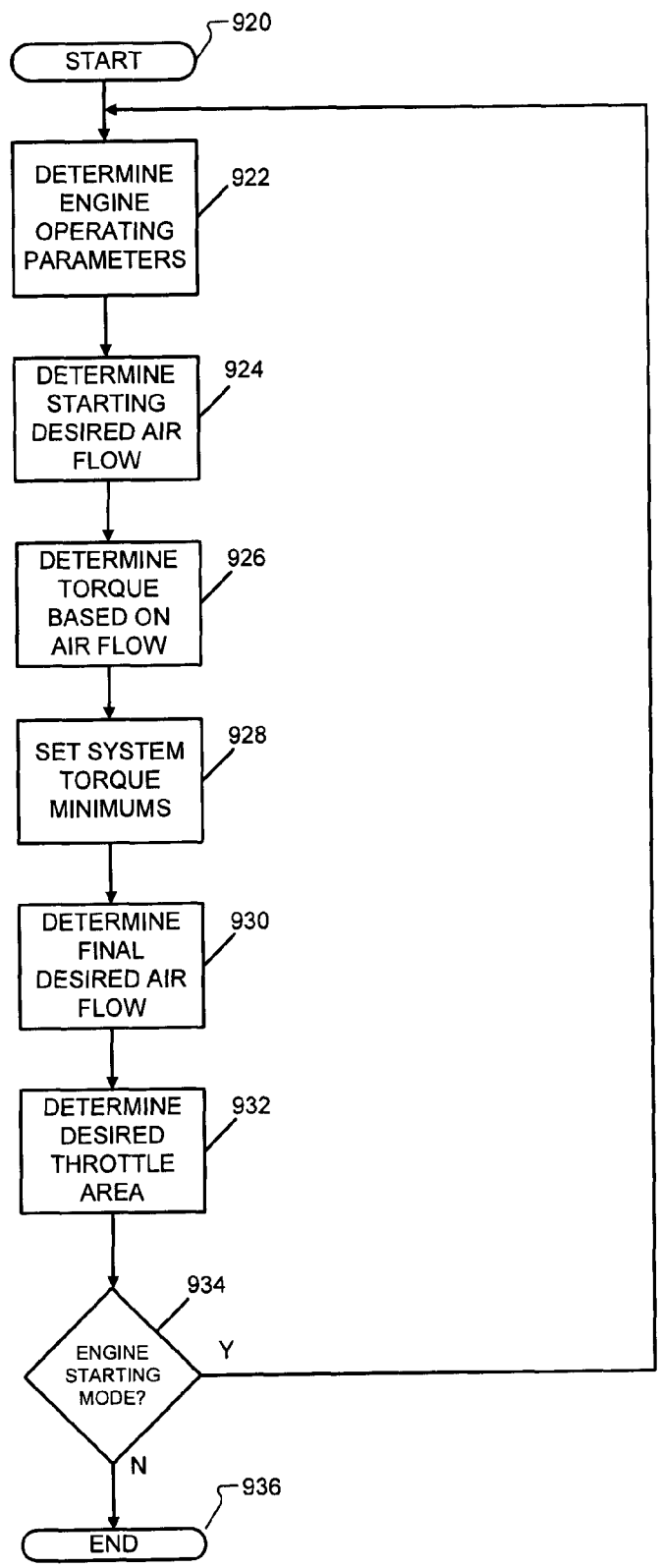
FIG. 13 illustrates a method of determining throttle area in accordance with an embodiment of the present disclosure.

Referring now to FIG. 4, a control system 400 is shown. The control system 400 includes an ECM 402, an HCM 404 and a motor generator unit (MGU) 406. The ECM 402 accurately controls the throttle in a torque based system through a crank air flow system. The crank air flow system is described at least with respect to the embodiments of FIGS. 13 and 14. A crank air flow system is further described in U.S. patent application Ser. No. 11/848,687, which is incorporate herein by reference in its entirety. The ECM 402 sets the throttle position to a calibratable value and then sets a predicted value for a combustion torque request (WOM) to initialize a speed control module. WOM torque may refer to combustion torque of the engine minus brake torque without EM torque applied. WOM torque may refer to the combustion torque minus, for example, accessory torque, supercharger friction, engine friction (pumping losses), power steering losses, air conditioning losses, etc. EM torque may be equal to crankshaft torque minus WOM torque.

The ECM 402 includes an axle torque arbitration module (AXLR), a first propulsion torque arbitration module (PTAR_ECM), a reserves and adjustments of torque module (RATR), and a propulsion torque control module TRQR. The AXLR, PTAR_ECM, and TRQR perform similarly as the axle torque arbitration module 330, the propulsion torque arbitration module 308, the reserve and load control module 333, and the propulsion torque control module 304 of FIGS. 3A and 3B.

The SPDR sends the desired idle speed to an engine start and stop module (ESSR) of the HCM 404. The PTAR_ECM transmits the desired crankshaft torque for the expected transmission load at the idle engine speed to a second propulsion torque arbitration module (PTAR_HCM). The signals may be provided during an auto start. The PTAR_ECM may include a brake torque arbitration module (BTAM) and an engine combustion torque module (ECTM). The BTAM determines appropriate crankshaft torque on an engine based on signals from the AXLR, a stall prevention or idle speed control module (SPDR), an engine over speed protection module (EOSR) and a transmission torque request module (TTQR). The SPDR communicates with a first engine capabilities and capacities module (ECPR_ECM), which communicates with a corresponding second engine capabilities and capacities module ECPR_HCM of the HCM 404. ECPR_HCM provides the torque limits of the ICE due to mechanical and combustion limits of an engine.

During an auto start or when in a startability mode, the ECTM may receive a desired crankshaft output torque signal or a combustion torque request signal (crankshaft torque without BAS EM torque or WOM) from a torque request arbitration module (TRAR) of the HCM. The ECTM may then control brake torque by signaling TRQR to adjust spark timing through the use of an immediate torque request. The ECSR provides key start and auto start signals respectively to the SPDR and the ECTM. The ECSR controls air actuation, such as throttle actuation, for engine start and stop events. An engine start and stop event refers to the activation and deactivation of an engine. The ECSR has a crank air flow mode, a crank torque mode, and a shutdown shudder mode.

During an auto start mode, ECSR indicates the crank air flow or crank torque mode and the ECTM uses the ECSR predicted torque request instead of the TRAR hybrid predicted request or the BTAM crankshaft torque request. The immediate request is provided by the HCM and the predicted request is provided by the ECM. This is none because air flow is slow and is used as a setpoint. Air flow is not controlled using a serial data bus because of serial data latencies. An immediate torque has a fast response time relative to a predicted torque response time and may be requested across a serial data link. The HCM may coordinate the EM and engine WOM torque for smooth control based on the immediate torque requests.

Torque reserve requests may be communicated to a reserves and adjustments of torque module (RATR). For example, during a catalyst light off event, air flow may be increased and spark may be retarded while brake torque determined by the PTAR is maintained. As another example, an offset torque may be determined to offset brake torque resulting from activation of air conditioning, which creates a load on the engine and affects engine torque output. The reserves and loads are used to satisfy the combustion or WOM torque requests from PTAR's ECTM.

During engine running operation a brake torque signal may be generated by the ECM 402 and provided to the HCM 404. The HCM 404 may then determine the amount of torque that is to be produced by engine combustion or WOM and how much torque is to be produced by an EM or MGU. The HCM 404 then generates a combustion torque request (WOM) signal, which is transmitted to the ECM 402. The ECM 402 controls production of combustion and/or WOM torque corresponding to the WOM signal.

Indicated torque is the torque produced by the combustion event. Brake/crankshaft/flywheel/trans. Input is the torque at the output of the flywheel going into the engine. When the engine is spinning and the fuel is OFF the WOM torque is equal to the negative spinning friction. As an example, for a four cylinder WOM torque may be −20 to −30 Nm. When the engine is fueled and idling in Neutral, the WOM torque may rise to zero. When the transmission is engaged (which it is on BAS auto starts) the WOM torque changes from −20 to −30 Nm to approximately 20 Nm to support the transmission torque converter.

At idle or when the engine is at an idle speed, the ECM 402 may control production of engine combustion and/or WOM torque without reference to a WOM signal from the HCM 404. Normal idle control may be provided using engine spark actuation via the ECM 402 and EM control via the HCM 404 for regeneration of a power supply. The ECTM may provide a bridge bypass from brake torque to engine combustion torque. In other words, the ECTM may determine the engine combustion torque based on the brake torque. The WOM torque may be equal to the brake torque minus the electric motor torque.

The RATR generates predicted and immediate torque request signals, which are received by the TRQR. The TRQR generates torque request signals and/or control signals that are provided to a boost actuator module (BSTR), a phase actuator module (PHSR), a throttle position and sensing module (TPSR), a spark control module (SPKR), and a fuel control module (FULR). The torque request and control signals, which may be predicted or immediate, may be generated based on signals from a cylinder deactivation module (CDAR) and an engine torque estimation module (ETQR).

The HCM 404 includes the ECPR_HCM, the PTAR_HCM, and the TRAR, and further includes a WOM versus EM fuel economy optimization control module (OITR), an engine start stop module (ESSR), an auto start and stop module (ASSR), an input and clutch speed control module (ICSR), and a hybrid motor torque module (HTDR).

The OITR may determine a desired WOM and EM torque based on the desired crankshaft torque. The OITR may monitor a power source or battery state of charge. The OITR may determine fuel consumption of the engine and determine adjustments in EM torque and/or generate combustion torque requests. The OITR may determine a steady state target to provide zero (0) motor torque, such as when performing an auto start.

The ESSR executes auto start and stops. The ESSR commands EM and engine speeds and torques. The ASSR receives vehicle and powertrain level inputs and determines whether the engine should be in an ON (activated) or OFF (deactivated) state. An engine may be considered activated when the engine produces a positive output torque, but the WOM torque may be positive or negative. The ON and OFF state is commanded to the ESSR. The ASSR may receive, for example, a coolant temperature signal, an air conditioning information signal, a MAP signal, a brake vacuum signal, and a transmission temperature signal, such as from the ECM 402 and/or from the sensors disclosed herein.

Figure 5:
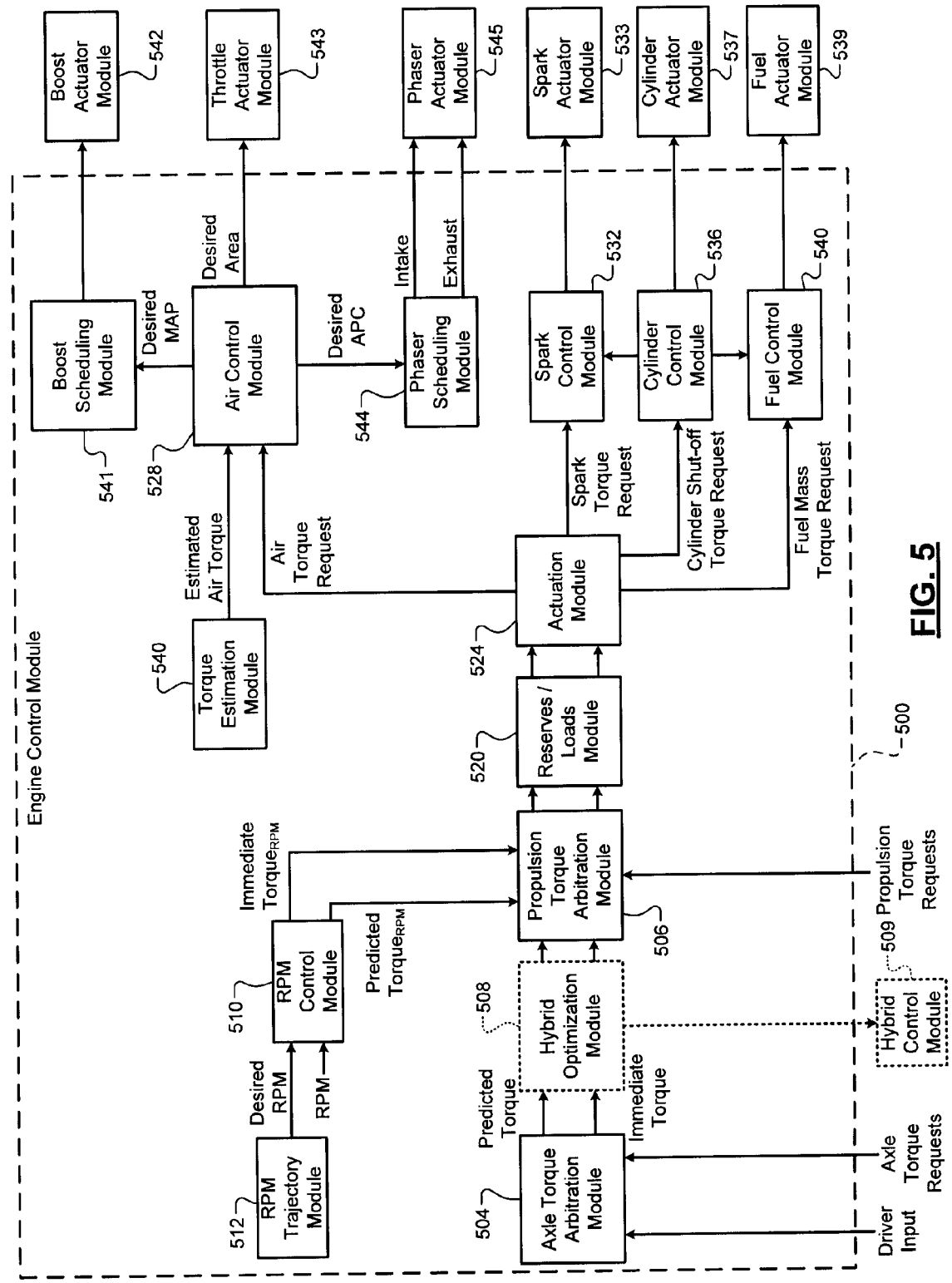
FIG. 5 is a functional block diagram of an engine control system in accordance with an embodiment of the present disclosure.

Referring now to FIG. 5, a functional block diagram of an exemplary engine control system is presented. An exemplary implementation of an ECM 500 includes an axle torque arbitration module 504. The axle torque arbitration module 504 arbitrates between a driver input from a driver input module and other axle torque requests. For example, the driver input may be based on position of an accelerator pedal. The driver input may also be based on cruise control, which may be an adaptive cruise control that maintains a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine cutoff requests, such as may be generated when a critical fault is detected.

The axle torque arbitration module 504 outputs a predicted torque and an immediate torque based on the results of arbitrating between the received torque requests. The predicted torque is the amount of torque that the ECM 500 prepares to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, spark advance may be adjusted quickly, while cam phaser position and air flow may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, a throttle valve can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 504 outputs the predicted torque and the immediate torque to a propulsion torque arbitration module 506. In various implementations, the axle torque arbitration module 504 may output the predicted torque and immediate torque to a hybrid optimization module 508. The hybrid optimization module 508 determines how much torque should be produced by an engine and how much torque should be produced by an EM. The hybrid optimization module 508 then outputs modified predicted and immediate torque values to the propulsion torque arbitration module 506. In various implementations, the hybrid optimization module 508 may be implemented in a HCM 509.

The predicted and immediate torques received by the propulsion torque arbitration module 506 are converted from an axle torque domain (torque at the wheels) into a propulsion torque domain (torque at the crankshaft). This conversion may occur before, after, as part of, or in place of the hybrid optimization module 508.

The propulsion torque arbitration module 506 arbitrates between propulsion torque requests, including the converted predicted and immediate torques. The propulsion torque arbitration module 506 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by a TCM to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine without regard to torque. The propulsion torque arbitration module 506 may still receive these shutoff requests so that, for example, appropriate data can be fed back to other torque requestors. For example, all other torque requestors may be informed that they have lost arbitration.

An RPM control module 510 may also output predicted and immediate torque requests to the propulsion torque arbitration module 506. The torque requests from the RPM control module 510 may prevail in arbitration when the ECM 500 is in RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 504 is less than a calibratable torque value.

The RPM control module 510 receives a desired RPM from an RPM trajectory module 512, and controls the predicted and immediate torque requests to reduce the difference between the desired RPM and the actual RPM. For example only, the RPM trajectory module 512 may output a linearly decreasing desired RPM for vehicle coastdown until engine RPM reaches an idle RPM. The RPM trajectory module 512 may then continue outputting the idle RPM as the desired RPM.

In various implementations, the RPM trajectory module 512 may function as described in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

A reserves/loads module 520 receives the arbitrated predicted and immediate torque requests from the propulsion torque arbitration module 506. Various engine operating conditions may affect the engine torque output. In response to these conditions, the reserves/loads module 520 may create a torque reserve by increasing the predicted torque request.

For example only, a catalyst light-off process or a cold start emissions reduction process may directly vary spark advance for an engine. The reserves/loads module 520 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque increases may be made to offset changes in the engine torque output during these processes.

The reserves/loads module 520 may also create a reserve in anticipation of a future load, such as the engagement of the air conditioning compressor clutch or power steering pump operation. The reserve for A/C clutch engagement may be created when the driver first requests air conditioning. Then, when the A/C clutch engages, the reserves/loads module 520 may add the expected load of the A/C clutch to the immediate torque request.

An actuation module 524 receives the predicted and immediate torque requests as output by the reserves/loads module 520. The actuation module 524 determines how the predicted and immediate torque requests will be achieved. The actuation module 524 may be engine type specific, with different control schemes for gas engines versus diesel engines. In various implementations, the actuation module 524 may define the boundary between modules prior to the actuation module 524, which are engine independent, and modules that are engine dependent.

For example, in a gas engine, the actuation module 524 may vary the opening of the throttle valve, which allows for a wide range of torque control. However, opening and closing the throttle valve results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 524 may generate an air torque request based on the predicted torque request. The air torque request may be equal to the predicted torque request, causing air flow to be set so that the predicted torque request can be achieved simply by changes to other actuators.

An air control module 528 may determine desired actuator values for slow actuators based on the air torque request. For example, the air control module 528 may control desired manifold absolute pressure (MAP), desired throttle area, and/or desired air per cylinder (APC). Desired MAP may be used to determine desired boost, and desired APC may be used to determine desired cam phaser positions.

In gasoline systems, the actuation module 524 may also generate a spark torque request, a cylinder shut-off torque request, and a fuel mass torque request. The spark torque request may be used by a spark control module 532 to determine how much to retard the spark (which reduces the engine torque output) from a calibrated spark advance. The spark control module 532 controls the spark actuator module 533. In diesel systems, fuel mass may be the primary actuator for controlling engine torque output.

The cylinder shut-off torque request may be used by a cylinder control module 536 to determine how many cylinders to deactivate. The cylinder control module 536 may instruct the cylinder actuator module 120 to deactivate one or more cylinders of the engine 102. In various implementations, a predefined group of cylinders may be deactivated jointly. The cylinder control module 536 may also instruct a fuel control module 537 to stop providing fuel for deactivated cylinders and may instruct the spark control module 532 to stop providing spark for deactivated cylinders.

The fuel mass torque request may be used by the fuel control module 537 to vary the amount of fuel provided to each cylinder. For example only, the fuel control module 537 may determine a fuel mass that, when combined with the current amount of air per cylinder, yields stoichiometric combustion. The fuel control module 537 may instruct the fuel actuator module 539 to inject this fuel mass for each activated cylinder. During normal engine operation, the fuel control module 537 may attempt to maintain a stoichiometric air/fuel ratio.

The fuel control module 537 may increase the fuel mass above the stoichiometric value to increase engine torque output and may decrease the fuel mass to decrease engine torque output. In various implementations, the fuel control module 537 may receive a desired air/fuel ratio that differs from stoichiometry. The fuel control module 537 may then determine a fuel mass for each cylinder that achieves the desired air/fuel ratio.

The approach the actuation module 524 takes in achieving the immediate torque request may be determined by a mode setting. The mode setting may be provided to the actuation module 524, such as by the propulsion torque arbitration module 506, and may indicate an inactive mode, a pleasible mode, a maximum range mode, and an auto actuation mode.

In the inactive mode, the actuation module 524 may ignore the immediate torque request and attempt to achieve the predicted torque request. The actuation module 524 may therefore set the spark torque request, the cylinder shut-off torque request, and the fuel mass torque request to the predicted torque request, which maximizes torque output for the current engine air flow conditions. Alternatively, the actuation module 524 may set these requests to predetermined (such as out-of-range high) values to disable torque reductions from retarding spark, deactivating cylinders, or reducing the fuel/air ratio.

In the pleasible mode, the actuation module 524 may attempt to achieve the immediate torque request by adjusting only spark advance. The actuation module 524 may therefore output the predicted torque request to the air control module 528 and the immediate torque request to the spark control module 532. The spark control module 532 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 524 may output the predicted torque request as the air torque request and the immediate torque request as the spark torque request. In addition, the actuation module 524 may generate a cylinder shut-off torque request that is low enough to enable the spark control module 532 to achieve the immediate torque request. In other words, the actuation module 524 may decrease the cylinder shut-off torque request (thereby deactivating cylinders) when reducing spark advance alone is unable to achieve the immediate torque request.

In the auto actuation mode, the actuation module 524 may decrease the air torque request based on the immediate torque request. For example, the air torque request may be reduced only so far as is necessary to allow the spark control module 532 to achieve the immediate torque request by adjusting spark advance. Therefore, in auto actuation mode, the immediate torque request is achieved while allowing the engine to return to the predicted torque request as quickly as possible. In other words, the use of relatively slowly-responding throttle valve corrections is minimized by reducing the quickly-responding spark advance as much as possible.

A torque estimation module 540 may estimate torque output of the engine. This estimated torque may be used by the air control module 528 to perform closed-loop control of engine air flow parameters, such as MAP, throttle area, and phaser positions. For example only, a torque relationship such as T=f(APC,S,I,E,AF,OT,#) may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 540 may determine APC based on measured MAF and current RPM, thereby allowing closed loop air control based on actual air flow. The intake and exhaust cam phaser positions used may be based on actual positions, as the phasers may be traveling toward desired positions. In addition, a calibrated spark advance value may be used. This estimated torque may be referred to as an air torque—i.e., an estimate of how much torque could be generated at the current air flow, regardless of the actual engine torque output, which varies based on spark advance.

The air control module 528 may generate a desired manifold absolute pressure (MAP) signal, which is output to a boost scheduling module 541. The boost scheduling module 541 uses the desired MAP signal to control the boost actuator module 542. The boost actuator module 542 then controls one or more turbochargers and/or superchargers.

The air control module 528 may generate a desired area signal, which is output to a throttle actuator module 543. The throttle actuator module 543 then regulates the throttle valve to produce the desired throttle area. The air control module 528 may use the estimated torque and/or the MAF signal in order to perform closed loop control. For example, the desired area signal may be controlled based on a comparison of the estimated torque and the air torque.

The air control module 528 may also generate a desired air per cylinder (APC) signal, which is output to a phaser scheduling module 544. Based on the desired APC signal and the RPM signal, the phaser scheduling module 544 may control positions of the intake and/or exhaust cam phasers using a phaser actuator module 545.

Referring back to the spark control module 532, spark advance values may be calibrated at various engine operating conditions. For example only, a torque relationship may be inverted to solve for desired spark advance. For a given torque request ($T_{des}$), the desired spark advance ($S_{des}$) may be determined based on $S_{des}=T^{-1}(T_{des},APC,I,E,AF,OT,\#)$. This relationship may be embodied as an equation and/or as a lookup table. The air/fuel ratio (AF) may be the actual ratio, as indicated by the fuel control module 540.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as lower octane fuel) and environmental factors. The torque at the calibrated spark advance may therefore be less than MBT.

In the following steps of FIGS. 6-10 multiple modes and methods of operation are described. The modes and methods may be applied to any one or combination of the systems of FIGS. 1-5. In the following steps, a first engine speed control mode refers to the control of engine speed by an HCM with EM torque as the primary controlling actuator. A second engine speed control mode refers to the control of engine speed by an ECM with WOM torque as the primary controlling actuator. The HCM and ECM may operate in the normal, backup, and aggressive auto start modes while operating in either of the first and second engine speed control modes. Also, in the following steps, spark retard and advance events are described. Spark timing is maintained within a normal operating range to prevent misfires. This improves torque estimates and reduces emission production.

The normal and aggressive modes are vehicle operator induced. The backup mode is system induced and not necessarily vehicle operator induced. The normal mode may be triggered when a vehicle operator lets off a brake pedal, which may be indicated by a brake pedal signal generated by a brake pedal sensor, and when an accelerator signal is less than a predetermined value (no tip-in to light tip-in). The backup mode may refer to when a control system performs an auto start due to the operation of air conditioning, the charging of a power supply, etc. The aggressive mode may be triggered when an accelerator signal is greater than the predetermined value (heavy tip-in).

The ECM controls the air flow actuators during an auto start. Air flow control provides a slow response and is thus a slow actuator. The ECM controls air flow instead of transferring air actuation torque commands between the ECM and HCM during an auto start, such as over a serial data link. This prevents throttle instability.

Figure 6:
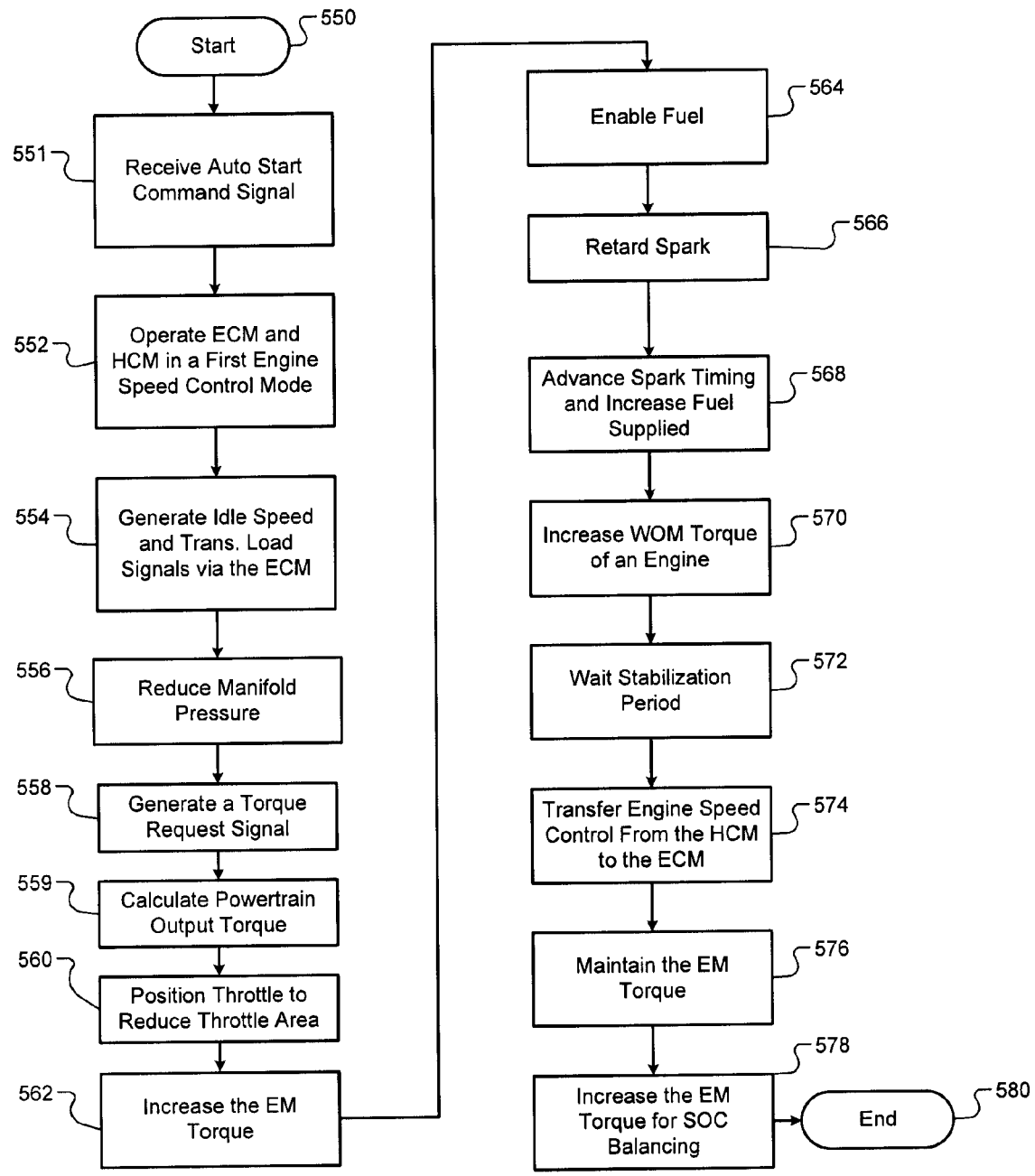
FIG. 6 illustrates a method of operating a control system in a normal or backup mode in accordance with an embodiment of the present disclosure.
Figure 7:
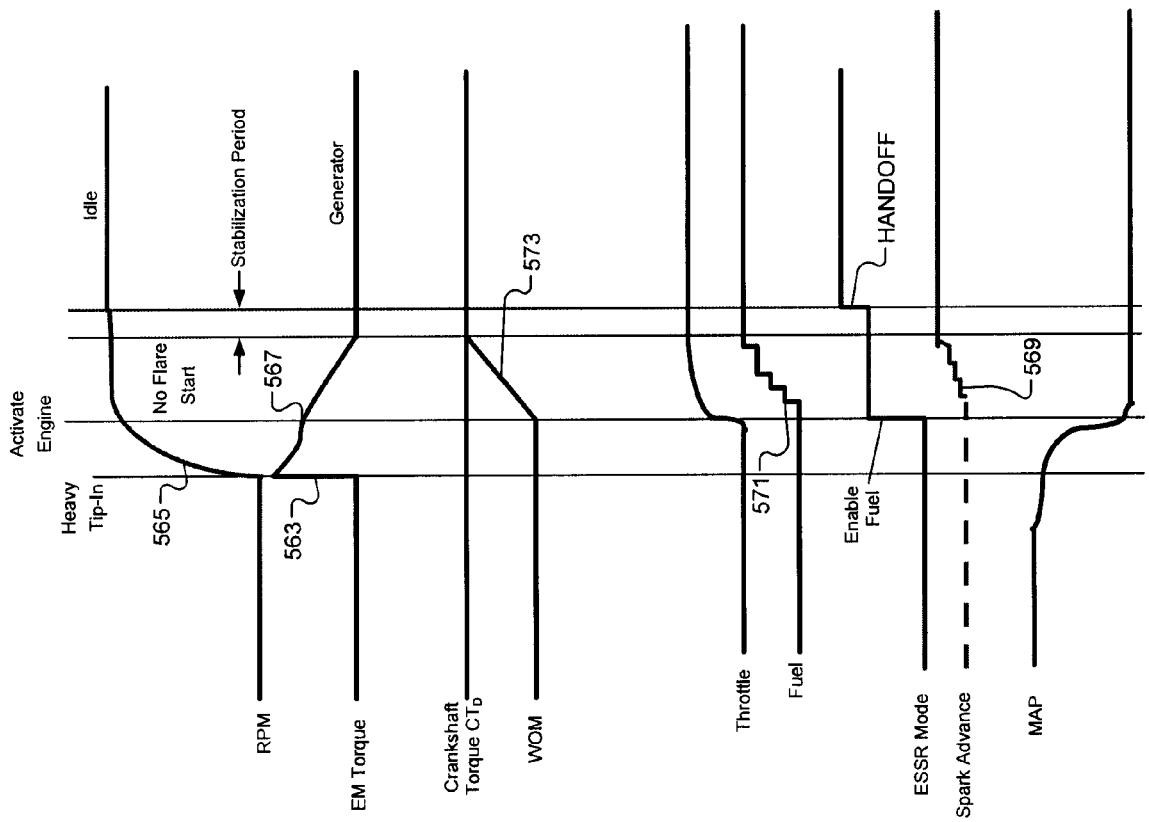
FIG. 7 is a signal diagram illustrating auto start aspects for normal and backup modes and in accordance with an embodiment of the present disclosure.

Referring now to FIGS. 6 and 7, a method of operating a control system in a normal or backup mode is shown. Although the following steps are primarily described with respect to the embodiments of FIGS. 1-5 and 7, the steps may be easily modified to apply to other embodiments of the present invention.

FIG. 7 includes an engine speed signal (RPM), an EM (EM) torque signal, a crankshaft torque desired signal, a WOM torque signal, a throttle position signal, a fuel cylinder enablement signal, an ESSR mode signal, a spark timing signal, and a MAP signal.

The method may begin at 550. In step 551, receiving an auto start command signal. The auto start command signal may refer to a signal generated by the HCM, the ECM, a main control module, or may refer to a signal generated by a brake sensor, an accelerator sensor, or other vehicle operator induced signal generator. For example, an auto start may be triggered when a vehicle operator lets off a brake pedal, which may be indicated by a brake pedal signal generated by a brake pedal sensor. As another example, an auto start may be triggered by the actuation of an accelerator. This may be indicated by an accelerator signal generated by an accelerator pedal sensor. The brake pedal signal and the accelerator signal may be referred to as an auto start command signal.

In step 552, the ECM and the HCM are operated in the first engine speed control mode. In step 554, the ECM generates an idle speed signal and a transmission load signal that is based on an idle speed of an engine.

In step 556, to minimize combustion torque when the engine is first fueled and spark is enabled, the manifold pressure of the engine is reduced (pumped down). This is performed before fuel and spark (ignition) are enabled and provides a smooth start. The reduction in manifold pressure reduces the pressures within the cylinders of the engine. The manifold pressure is reduced before activating the engine (increasing WOM torque). The EM torque may be increased to increase the engine speed to pump down the manifold and/or cylinders of the engine.

In step 558, a torque request signal may be received or generated. The torque request signal may be received by a module of the ECM and correspond to a powertrain output torque desired when initializing an auto start. The powertrain desired output torque may be, for example, equal to the torque of the engine at minimum air flow and minimum spark (spark timing retarded) while combusting properly without a misfire. In step 559, the ECM may calculate a powertrain output torque based on the torque request signal. In order to minimize engine speed bumps (abruptness in engine speed acceleration or deceleration) experienced while enabling the fuel and spark, the combustion torque may be minimized and then ramped up to the desired idle crankshaft torque level.

In step 560, the ECM positions a throttle based on the determined and/or calculated predicted torque for minimizing throttle area. While in the first and second engine speed control modes, the air flow to the engine is controlled by the ECM. The ECM may control air flow and convert a requested torque into a throttle position. This provides a steady throttle request. The air flow may be controlled as described with respect to the embodiments of FIGS. 13 and 14. The ECM may control throttle position based on a cranking cylinder event and a coolant temperature of the engine. The throttle area is increased as the engine speed is increased.

Crank air flow tables may be used for auto starts. The crank air flow tables may be different for the normal, backup and aggressive modes. For a normal or backup mode, the crank air flow tables may have an initial start point that is calibrated to close the throttle to improve reduction in MAP pressure. The crank air flow tables may transition from the initial start point to an idle air flow point that corresponds with providing a throttle position for operating the engine at idle and providing zero EM torque.

For the aggressive mode, the crank air flow tables may have an initial start point that corresponds with the throttle being partially open. In addition or as an alternative, the crank air flow tables may have points that correspond with the ramp up of air flow at a quicker rate than points associated with the normal and backup modes.

The crank air flow tables may include, for example, a first table that relates crank event, coolant temperature and air flow. The control system may be calibrated and the first table may be associated with a base accelerator pedal position. For example, a base pedal position may refer to a 10% rotated position. An air flow level X may be determined based on a current crank event and coolant temperature for the 10% rotated position. A throttle area or throttle position may be determined based on the air flow level X.

A second crank air flow table may relate accelerator pedal positions to the base pedal position via multiplication factors. For example, a 20% pedal position may have a corresponding multiplication factor Y. The air flow level X may be multiplied by the multiplication factor Y to determine the air flow Z for the 20% pedal position.

In step 562, the EM torque is increased to a predetermined level to overcome friction and pumping pressures of the engine and to support the transmission input load. This is shown by section 563 of the EM torque signal of FIG. 7. The EM torque is provided to the crankshaft of the engine. The EM torque is adjusted to increase speed of the engine based on the idle speed signal and the transmission load signal. This adjustment may be performed as described with respect to the embodiment of FIG. 12. The increase in engine speed is shown by section 565 of the RPM signal.

The HCM ramps up the EM power based on a desired idle speed signal and an expected torque load or transmission load signal from the ECM. EM torque may be reduced while the engine speed is ramping up because there is less inertia to overcome. This is shown by the section 567 of the EM torque signal and is done before the WOM torque of the engine is enabled. The HCM adjusts the EM torque to increase speed of the engine based on the idle speed signal and the transmission load signal. This adjustment may be performed as described with respect to the embodiment of FIG. 12.

In step 564, fuel to the engine is enabled. Fuel injectors may be sequentially enabled with no delays between injectors. The incorporation of delays can reduce accuracy of a torque estimate, which may be used by the HCM when adjusting the EM torque. The ECM may determine an average estimate of torque output of the engine based on the number of cylinders that are active. The use of delays may result in the average estimate being inaccurate at certain times. The delays also lengthen time involved in performing an auto start.

In step 566, the ECM may retard spark of the engine to minimize the combustion torque when the engine fuel is first enabled. In step 568, the ECM advances spark timing and increases fuel supplied to the engine. This is shown by section 569 of the spark timing signal and section 571 of the fuel signal. On a diesel engine the fuel mass is controlled. The adjustment in spark may be based on the desired crankshaft output torque signal. Step 566 may be performed before step 564.

In step 570, the ECM activates and increases combustion torque and/or WOM torque of the engine to at least an idle speed torque level. This allows the engine to remain at and/or be maintained at an idle speed based on combustion torque of the engine without aid from an EM or MGU. The ECM may increase combustion torque of the engine and/or WOM torque to provide the desired crankshaft output torque. The increase in WOM torque is shown by section 573 of the WOM signal that may be sent from the HCM to the ECM.

The HCM may generate a WOM torque request through the generation of a desired crankshaft output torque signal. This may correspond with an open loop transmission load. The HCM may ramp the WOM torque request from an engine friction torque level to the desired steady state transmission load level. This may be done based on the average estimate of torque output of the engine determined by the ECM. The ECM may ramp the combustion torque from a friction torque level of the engine to an idle speed torque level that corresponds with a steady state transmission load.

In step 572, the HCM waits a stabilization period. This allows for a consistent EM torque to be determined, maintained and used when a transfer in engine speed control is performed. This also allows for EM torque error or a transmission load error to be determined by the HCM. The ECM torque error or transmission load error is maintained in a constant state until after the transfer of engine speed control to the ECM.

In step 574, the HCM transfers control of engine speed from the HCM to the ECM. This transfer occurs after the engine is operating at a speed greater than or equal to an idle speed. This transfer also occurs after the WOM torque is approximately equal to the desired crankshaft output torque. The EM or MGU may be operating as a generator after step 572. The ECM may control engine speed through the adjustment of spark timing. This may occur when the HCM determines that the auto start has finished. The HCM and the ECM change operating modes based on the same indication, such as the ESSR mode signal or engine speed control mode signal.

When the transfer occurs, an input and clutch speed control module (ICSR), as above described, may determine an EM torque error. The EM torque error may be provided to the ECM from the HCM during the transfer of control. The ECM may adjust the EM torque error accordingly. The EM torque error is a learned torque error, which may be due to engine WOM torque estimation error due to a difference in transmission load from a nominal system. A transmission load of a nominal system refers to an average transmission load over multiple vehicles. After the transition, the ICSR may ramp the EM torque error to zero. This is communicated through the TRAR command predicted motor torque, which is used as the steady state EM load. This allows for the control system to learn any start-to-start variations. This prevents an abrupt increase or decrease in actuator adjustments when transitioning to ECM engine speed control. The ICSR closed loop adjusts the engine speed to the desired speed level. The EM torque may provide the torque error between the WOM torque provided and an expected WOM torque based on a nominal system.

A learned integral of EM torque error for closed loop control is transferred through the command predicted motor torque to the ECM. As the TRAR command predicted motor torque changes, the ECM adjusts the WOM torque accordingly. The ICSR may perform as a proportional-integral-derivative (PID) controller with the integral portion communicated to the ECM the torque error learned during the auto start. Instead of ramping the proportional gain down, the integral portion is provided to the ECM through the command predicted motor torque. ECM may provide a nominal WOM torque amount initially. The ICSR may adjust the EM torque, when the current engine speed does not match the desired engine speed. The EM is used to adjust the output torque of the engine to provide the desired engine speed. This may be performed using and/or based on a calibratable timer, a calibratable engine speed, and EM torque deviation thresholds.

In step 576, the EM torque is maintained at approximately zero Newton-meters (Nm). WOM actuators (air, fuel and spark) are set to provide an EM torque base of approximately zero. Due to WOM estimate error and transmission load variation from nominal, the WOM actuators are adjusted. The EM torque is not controlled to zero unless the ECM closed loop system determines that an EM torque of zero is appropriate to control the engine at the desired idle speed. In step 578, after the handoff to ECM control of idle speed, the EM torque may be increased or ramped to an EM torque level for balancing a state-of-charge (SOC) of a power source. For example only, the SOC may be approximately between 35-65% of a full SOC. Step 576 may be performed after the WOM torque is stable. This is because air flow control is relatively slow. When the HCM control changes, for example, by −20 Nm torque requested output for charging purposes, the ECM offsets for that change. The air flow during cranking is not dynamic depending on state-of-charge (SOC) of a power source. Variability in torque output is removed after ECM idle speed control is engaged. The method may end at 580.

The above-described steps are meant to be illustrative examples; the steps may be performed sequentially, synchronously, simultaneously, continuously, during overlapping time periods or in a different order depending upon the application.

Figure 8:
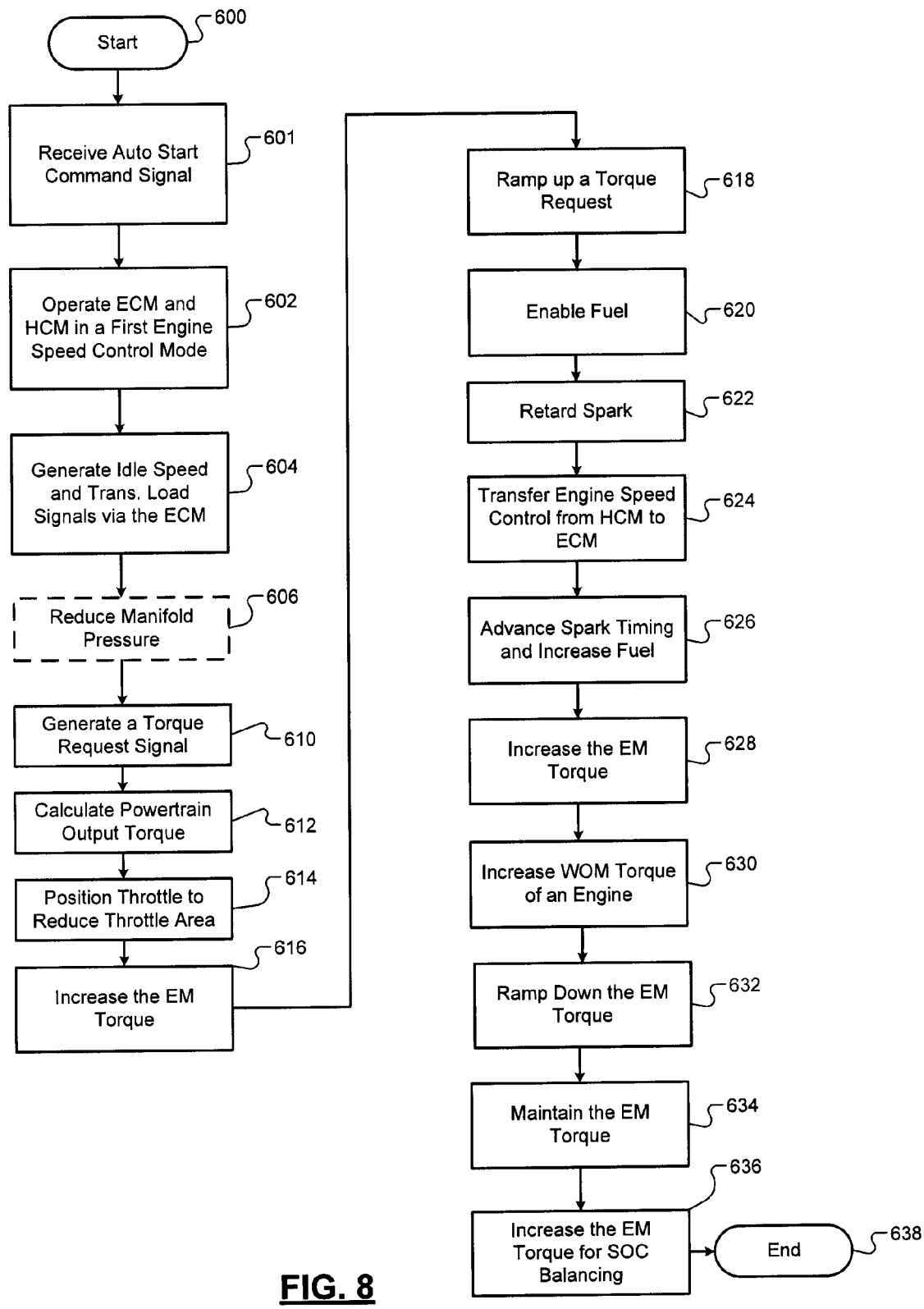
FIG. 8 illustrates a method of operating a control system in an aggressive mode and in accordance with an embodiment of the present disclosure.
Figure 9:
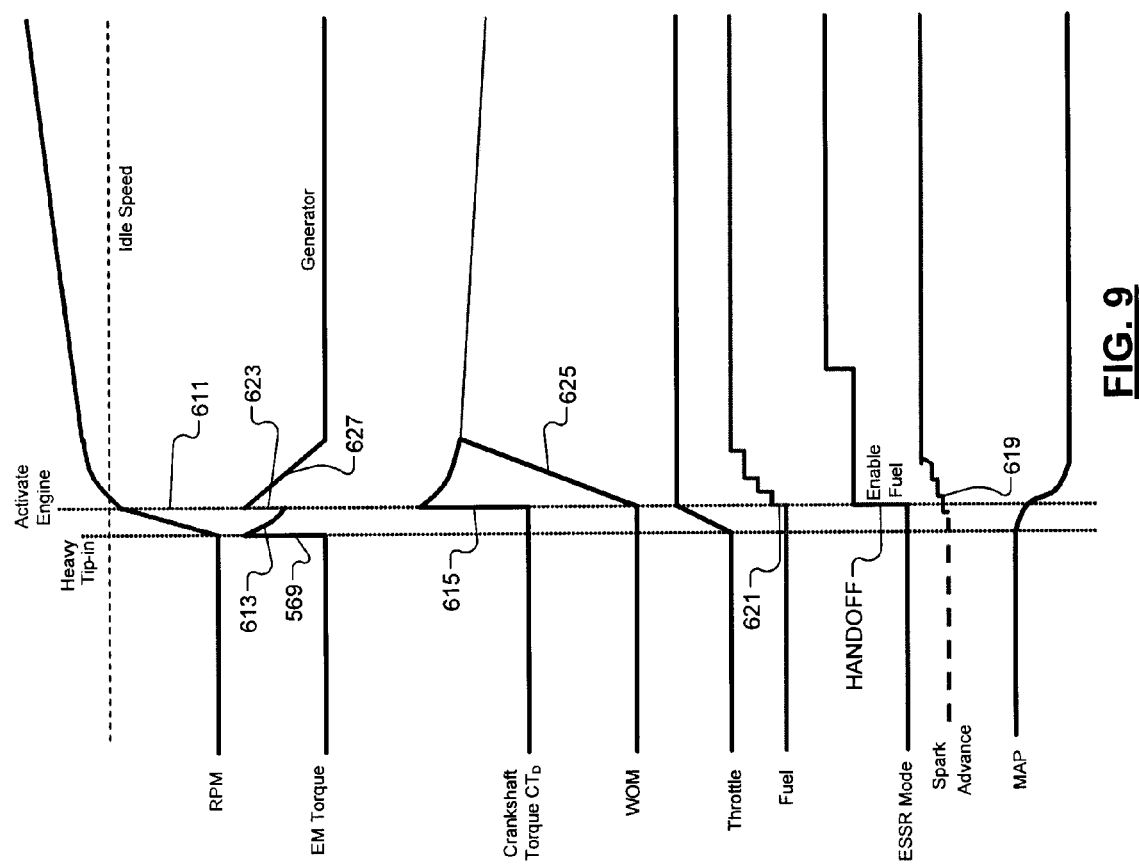
FIG. 9 is a signal diagram illustrating auto start aspects for an aggressive mode and in accordance with an embodiment of the present disclosure.

Referring now to FIGS. 8 and 9, a method of operating a control system in an aggressive mode is shown. Although the following steps are primarily described with respect to the embodiments of FIGS. 1-5 and 9, the steps may be easily modified to apply to other embodiments of the present invention.

FIG. 9 includes an engine speed signal (RPM), an EM (EM) torque signal, a crankshaft torque desired signal, a WOM torque signal, a throttle position signal, a fuel supply signal, an ESSR mode signal, a spark timing signal, and a MAP signal.

The method may begin at 600. In step 601, receiving an auto start command signal. The auto start command signal may refer to a signal generated by the HCM, the ECM, a main control module, or may refer to a signal generated by a brake sensor, an accelerator sensor, or other vehicle operator induced signal generator.

In step 602, the ECM and the HCM are operated in the first engine speed control mode. In step 604, the ECM generates an idle speed signal and a transmission load signal that is based on an idle speed of an engine.

In step 606, to minimize combustion torque when the engine is first fueled and spark is enabled, the manifold pressure of the engine is reduced (pumped down). This is performed before fuel and spark (ignition) are enabled and provides a smooth start. This also reduces the initial output torque of the engine when activated. The manifold pressure is reduced before activating the engine.

In step 610, a torque request signal may be received or generated. The torque request signal may be received by a module of the ECM and correspond to a powertrain output torque desired when initializing an auto start. The powertrain desired output torque may be, for example, equal to the torque of the engine at minimum air flow and minimum spark (spark timing retarded) while combusting properly without a misfire. In step 612, the ECM may calculate a powertrain output torque based on the torque request signal.

In step 614, the ECM positions a throttle based on the determined and/or calculated predicted torque for minimizing throttle area. While in the first and second engine speed control modes, the air flow to the engine is controlled by the ECM. The ECM may control air flow and convert a requested torque into a throttle position. The air flow may be controlled as described with respect to the embodiments of FIGS. 13 and 14. The controlling of air flow minimizes the combustion torque when spark is enabled. The ECM may control throttle position based on a cranking cylinder event and a coolant temperature of the engine, as described above with respect to the embodiment of FIGS. 6 and 7. The throttle area is increased as the engine speed is increased.

In step 616, the EM torque is increased to a predetermined level to overcome friction and pumping pressures of the engine and to support the transmission input load. This is shown by section 609 of the EM torque signal. The EM torque is adjusted to increase speed of the engine based on the idle speed signal and the transmission load signal. This adjustment may be performed as described with respect to the embodiment of FIG. 12. The increase in engine speed is shown by section 611 of the RPM signal.

The HCM ramps up the EM power based on a desired idle speed signal and an expected torque load or transmission load signal from the ECM. EM torque may be reduced while the engine speed is ramping up because there is less inertia to overcome. This is shown by section 613 of the EM torque signal. The HCM adjusts the EM torque to increase speed of the engine based on the idle speed signal and the transmission load signal. This adjustment may be performed as described with respect to the embodiment of FIG. 12.

In step 618, the HCM or ECM may increase a generated torque request as shown by the desired crankshaft output torque signal at section 615. This may be based on a driver accelerator pedal request. The desired crankshaft output torque is based on a drivability control desired torque level for a vehicle speed, an engine speed and an accelerator position. The HCM or ECM may ramp the WOM torque request from an engine friction torque level to the desired crankshaft output torque level corresponding to the driver accelerator pedal request. The EM torque provides the difference between the desired crankshaft torque level and the WOM torque output.

In step 620, fuel to the engine is enabled. Step 616 may be performed at the same time or during the same time period as step 614. Fuel injectors may be sequentially enabled with no delays between injectors. In step 622, the ECM may retard spark of the engine to minimize the combustion torque when the engine fuel is first enabled. Step 622 may be performed before step 620.

In step 624, a mode change and handoff is performed. Instead of transferring control of idle engine speed between the HCM and the ECM, there is a handoff from HCM idle speed control to an ECM driver torque request mode. The HCM transfers control of engine speed from the HCM to the ECM. This transfer occurs at a point where the engine speed has been increased to a point where the transmission lash has been engaged and a bump is avoided. The ECM adjusts the vehicle operator requested torque based on a zero-pedal torque (ZPT), accelerator pedal interpretation, and a current engine speed. The ECM control transfer (switch) from auto start to the ECM driver torque request mode (nominal mode) may be performed by an ECSR that is transitioning to a no request based on an enable fuel and aggressive mode indication. In other words, the HCM and the ECM switch from operating in an idle speed control mode that is controlled by the HCM to an ECM driver torque request mode that is controlled by the ECM. The engine speed may increase above the idle speed in the ECM driver torque request mode.

When the transfer occurs, an input and clutch speed control module (ICSR), as above described, may determine an EM torque error. After the transition, the ICSR may ramp the EM torque error to zero. This is communicated through the TRAR command predicted motor torque. This allows for the control system to learn any start-to-start variations. This prevents an abrupt increase or decrease in actuator adjustments when transitioning to ECM engine speed control. The ICSR provides a closed loop that reduces the EM torque error to zero, which alters the TRAR command predicted motor torque. As the TRAR command predicted motor torque changes, the ECM adjusts the WOM torque accordingly. This may be performed using and/or based on a calibratable timer, a calibratable engine speed, and EM torque deviation thresholds.

In step 626, the ECM advances spark and increases fuel supplied to the engine. This may occur when the engine is activated. This is shown by section 619 of the spark signal and section 621 of the fuel signal. On a diesel engine the fuel mass is controlled. The adjustment in these fast actuators (spark and fuel actuators) may be based on the desired WOM output torque signal.

In step 628, the HCM increases EM torque, as shown by section 623. This achieves the desired crankshaft torque output signal using the relationships associated with FIG. 12 (EM torque equals crankshaft torque minus WOM torque). In step 630, the ECM may increase combustion torque of the engine and/or WOM torque to match the desired crankshaft output torque. The increase in WOM torque is shown by section 625 of the WOM signal and may be commanded by the HCM.

In step 632, the HCM ramps down the EM torque, as shown by section 627. The HCM may ramp down the EM torque based on the difference between the desired crankshaft torque and the WOM torque. As the difference decreases the EM torque is decreased. The ECM may be in a normal vehicle operator interpretation mode. The EM is used to provide the ECM commanded torque request while the WOM torque output of the engine is increasing and is below the desired crankshaft output torque. The ECM may begin operating in the normal vehicle operator interpretation mode when the ESSR signal indicates that fuel is enabled.

In step 634, the EM torque is maintained at approximately 0 Newton-meters (Nm). In step 636, the EM torque may be increased or ramped to an EM torque level for balancing a state-of-charge (SOC) of a power source or one or more batteries. Step 636 may be performed after the WOM torque is stable. A timer may be used to ensure that the ECM manifold/air flow is to a level that provides the driver request and to ensure that all cylinders have been fueled. The method may end at 638.

The above-described steps are meant to be illustrative examples; the steps may be performed sequentially, synchronously, simultaneously, continuously, during overlapping time periods or in a different order depending upon the application.

Figure 10:
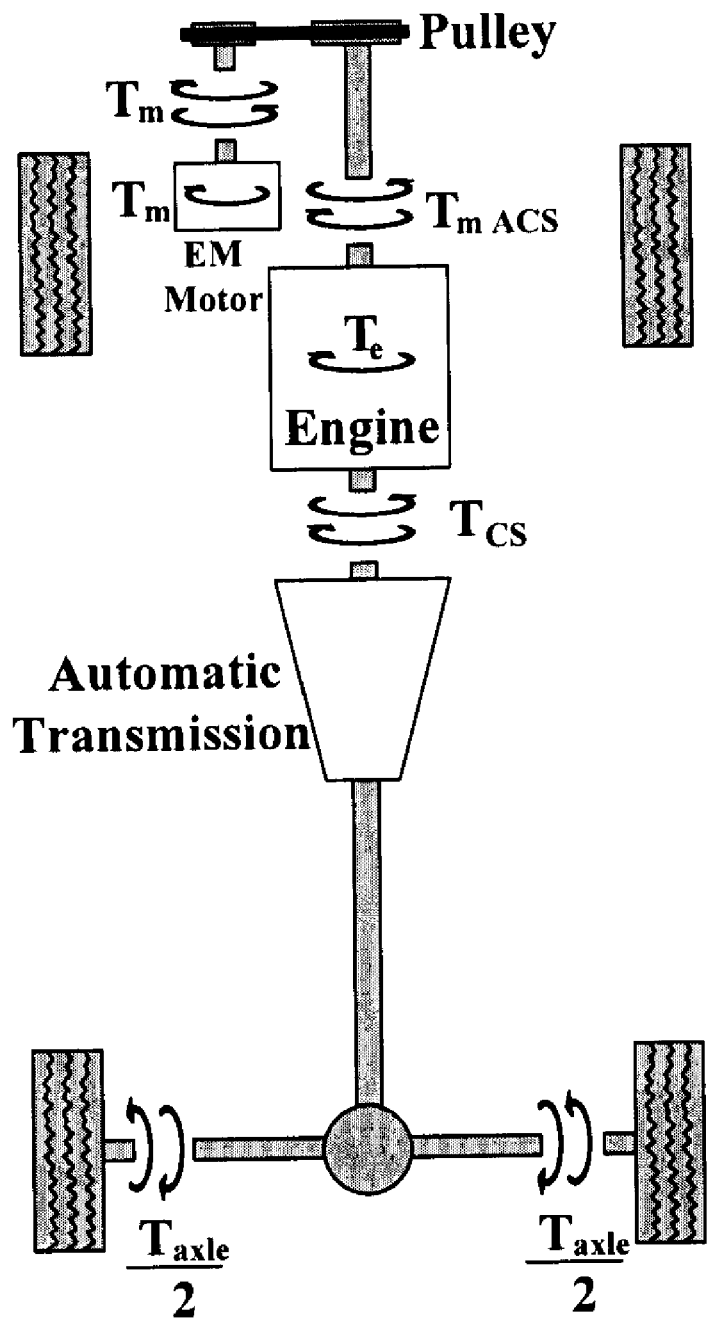
FIG. 10 is a diagram illustrating powertrain torques.

Referring now to FIG. 10, a diagram illustrating powertrain torques for a BAS system is shown. WOM torque $T_e$ is the torque generated at the crankshaft from cylinder pressure, friction, and engine driven accessories (power steering, air conditioning, water pump, cooling fan, supercharger, etc.) but it does not include the EM torque or BAS torque. The WOM torque $T_e$ plus the EM torque applied to the crankshaft $T_{mACS}$ (motor torque scaled) is equal to the crankshaft torque $T_{CS}$, as shown by equation 1.

$$T_{CS} = T_e + T_{mACS} \quad (1)$$

The EM torque applied to the crankshaft $T_{mACS}$ is equal to the EM torque $T_m$ multiplied by a pulley ratio for a BAS system, as shown by equation 2.

$$T_{mACS} = T_m \cdot \text{Pulley Ratio} \quad (2)$$

The accelerator pedal position and brake pedal position (as well as several other inputs) determine the desired crankshaft output torque or crankshaft torque command $T_{CSCmnd}$. An HCM may determine the appropriate method for achieving the crankshaft torque command $T_{CSCmnd}$ and generates a WOM torque request (command) $T_{eCmnd}$ and an EM torque command $T_{mCmnd}$, as provided by equation 3, where $T_{eActual}$ is the actual WOM torque. The WOM torque request $T_{eCmnd}$ is provided to the ECM and based thereon the actual WOM torque $T_{eActual}$ is provided. This compensates for transient engine torque error. Equation 3 may be used when in an engine torque control mode.

$$T_{mCmnd} = \frac{T_{CSCmnd} - T_{eActual}}{\text{Pulley Ratio}} \quad (3)$$

Equation 4 may be used when in an engine speed control mode or a fuel economy mode. In this mode, the EM torque command $T_{mCmnd}$ is equal to the crankshaft torque command $T_{CSCmnd}$ minus the WOM torque command $T_{eCmnd}$.

$$T_{mCmnd} = \frac{T_{CSCmnd} - T_{eCmnd}}{\text{Pulley Ratio}} \quad (4)$$

In an auto start or auto stop active mode (ESSR override mode) equation 5 may be used to generate the EM torque command $T_{mCmnd}$.

$$T_{mCmnd} = \frac{T_{CSLoadEstHTDR} - T_{eEstESSR} + J_e \cdot \dot{N}_{eESSR}}{\text{Pulley Ratio}} + T_{CLICSR} \quad (5)$$

$T_{CSLoadEstHTDR}$ is the estimated crankshaft load determined by a HTDR (combined engine and motor torque applied to the crankshaft to support the transmission load), $T_{eEstESSR}$ is engine torque estimated by an ESSR, $J_e$ is engine inertia (combined engine and motor inertia with respect to the crankshaft), N is engine speed, $\dot{N}_{eESSR}$ is engine acceleration determined by the ESSR, $T_{CLICSR}$ is a torque command from a closed loop speed control module or an ICSR that is generated to maintain a desired engine speed.

During an auto start or auto stop the crankshaft torque command from the ECM represents the torque converter load at the desired idle speed. The HTDR modifies this signal as a function of engine speed to be zero when the engine is stopped. The resulting signal is an estimate of the torque converter load.

When an auto start or auto stop is active the ESSR modifies the engine torque estimate by subtracting a drag torque calibration. The drag torque is a low speed correction for the engine torque model. The ESSR calculates the engine speed command used by the ICSR, and the engine acceleration command used by the HTDR.

During an auto start or auto stop the closed loop motor speed control provided by the ICSR is enabled. When transitioning from an auto start to normal operation the closed loop term of the closed loop is ramped to zero. The motor torque command is limited to the motor torque capacities, battery power limits, voltage limits, and current limits.

Figure 11:
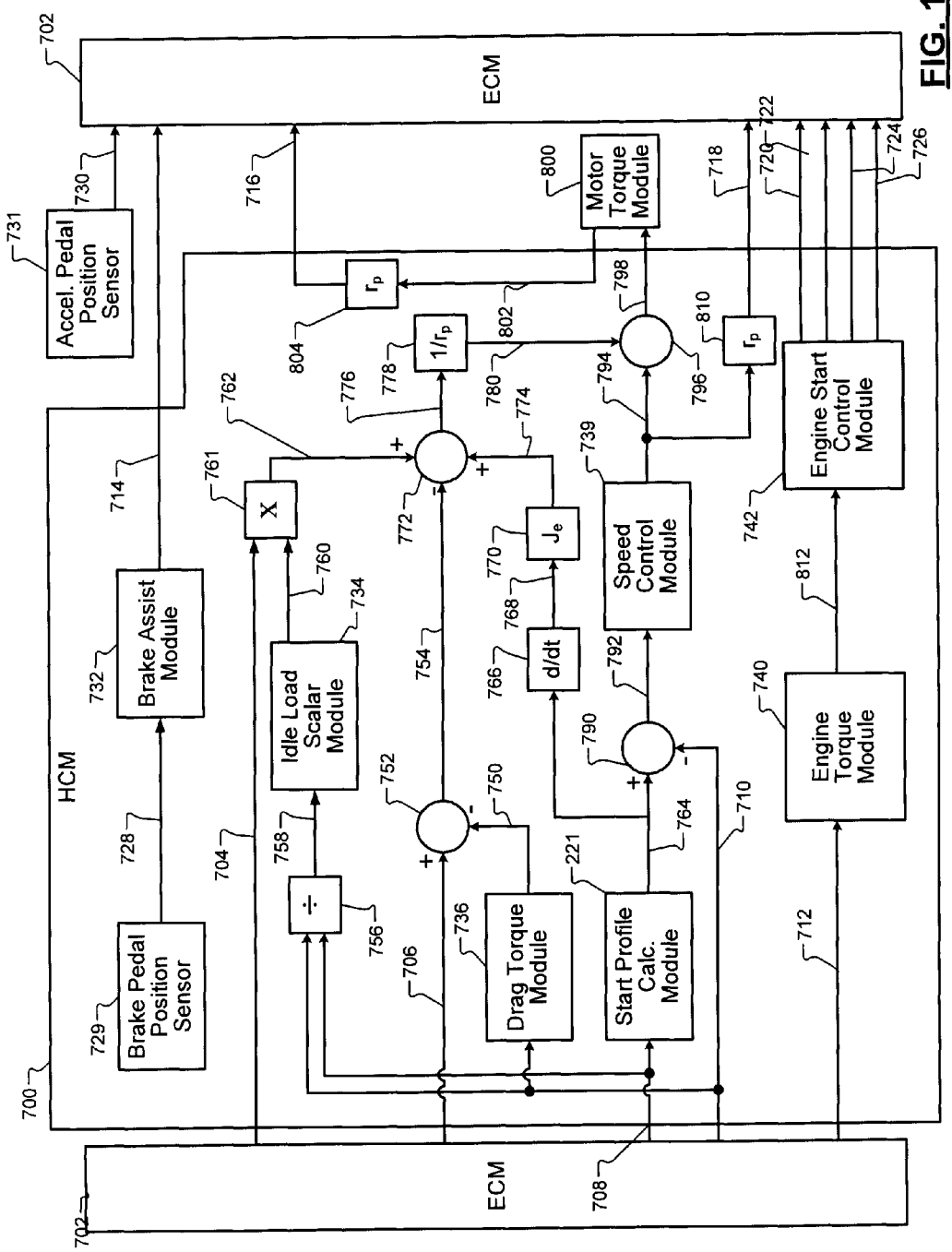
FIG. 11 is a functional block diagram illustrating motor torque determination in accordance with an embodiment of the present disclosure.

Referring now to FIG. 11, a diagram illustrating motor torque determination is shown. The diagram discloses an HCM 700 and an ECM 702. The HCM 700 receives ECM outputs, such as a crankshaft torque command 704, an engine torque actual (WOM torque actual) signal 706, an idle speed command 708, an engine speed signal 710 and a predicted crankshaft torque command 712 and generates ECM inputs. The ECM inputs include a brake assist delta axle torque request 714, a motor torque actual at crankshaft signal 716, a predicted motor torque at crankshaft signal 718, a predicted engine torque command 720, a current engine torque command 722, an engine torque response type signal 724, and an engine start/stop mode signal 726. The HCM 700 also receives a brake pedal position signal 728 from a brake pedal position sensor 729. The ECM 702 also receives an accelerator pedal position signal 730 from an accelerator pedal position sensor 731.

The HCM 700 includes a brake assist module 732, an idle load scalar module 734, a drag torque module 736, a start profile calculation module 738, a speed control module 739, an engine torque module 740, and an engine start control module 742. The brake assist module 732 generates the brake assist delta axle torque request 714 based on the brake pedal position signal 728.

The idle speed command 708 is provided to the drag torque module 736 and the start profile calculation module 738. The drag torque module 736 determines drag torque 750 based on the engine speed signal 710 and a drag torque table. The drag torque 750 is subtracted from the engine torque actual signal 706 by a first summer 752 to generate an engine torque estimate 754. The engine speed signal 710 is dived by the idle speed command signal 708 via a divider 756 to generate an idle speed fraction value 758.

The idle load scalar module 734 generates an idle load scalar 760 based on the idle speed fraction value 758 and an idle load scalar table. The idle load scalar 760 is multiplied by the crankshaft torque command 704 via a multiplier 761 to generate a torque converter load estimate 762.

The start profile calculation module 738 generates an engine speed command 764 based on the idle speed command 708. The derivative of the engine speed command 764 is determined by a derivative module 766 to generate an engine acceleration command 768. The engine acceleration command 768 is multiplied by the engine inertia $J_e$, via multiplier 770 and the result is provided to a second summer 772.

The second summer 772 subtracts the engine torque estimate 754 from the sum of the torque converter load estimate 762 and the multiplied result of the engine acceleration command and the engine inertia $J_e$ 774. The summed result 776 from the second summer 772 is divided by the pulley ratio $r_p$ via a divider 778 to generate an open loop motor torque 780.

The engine speed 710 is subtracted from the engine speed command 764 via a third summer 790. The summed result 792 of the third summer 790 is used by the speed control module 739 to generate a closed loop motor torque 794. The open loop motor torque 780 and the closed loop motor torque 794 are summed by a fourth summer 796 to generate a motor torque command 798. A motor torque module 800 generates a motor torque actual signal 802 based on the motor torque command 798. The motor torque actual signal 802 is multiplied by the pulley ratio $r_p$ to generate the motor torque actual at crankshaft signal 716 via a first pulley ratio module 804.

The closed loop motor torque 794 is multiplied by the pulley ratio $r_p$ via a second pulley ratio module 810 to generate the predicted motor torque at crankshaft signal 718. The engine torque module 740 generates a desired engine torque command 812 based on the predicted crankshaft torque command 712. The desired engine torque command 812 and the predicted crankshaft torque command 712 correspond with a torque converter load at a desired idle speed.

The engine start control module 742 generates the predicted engine torque command 720, the current engine torque command 722, the engine torque response type signal 724 and the engine start/stop mode signal 726 based on the desired engine torque command 812.

Figure 12:
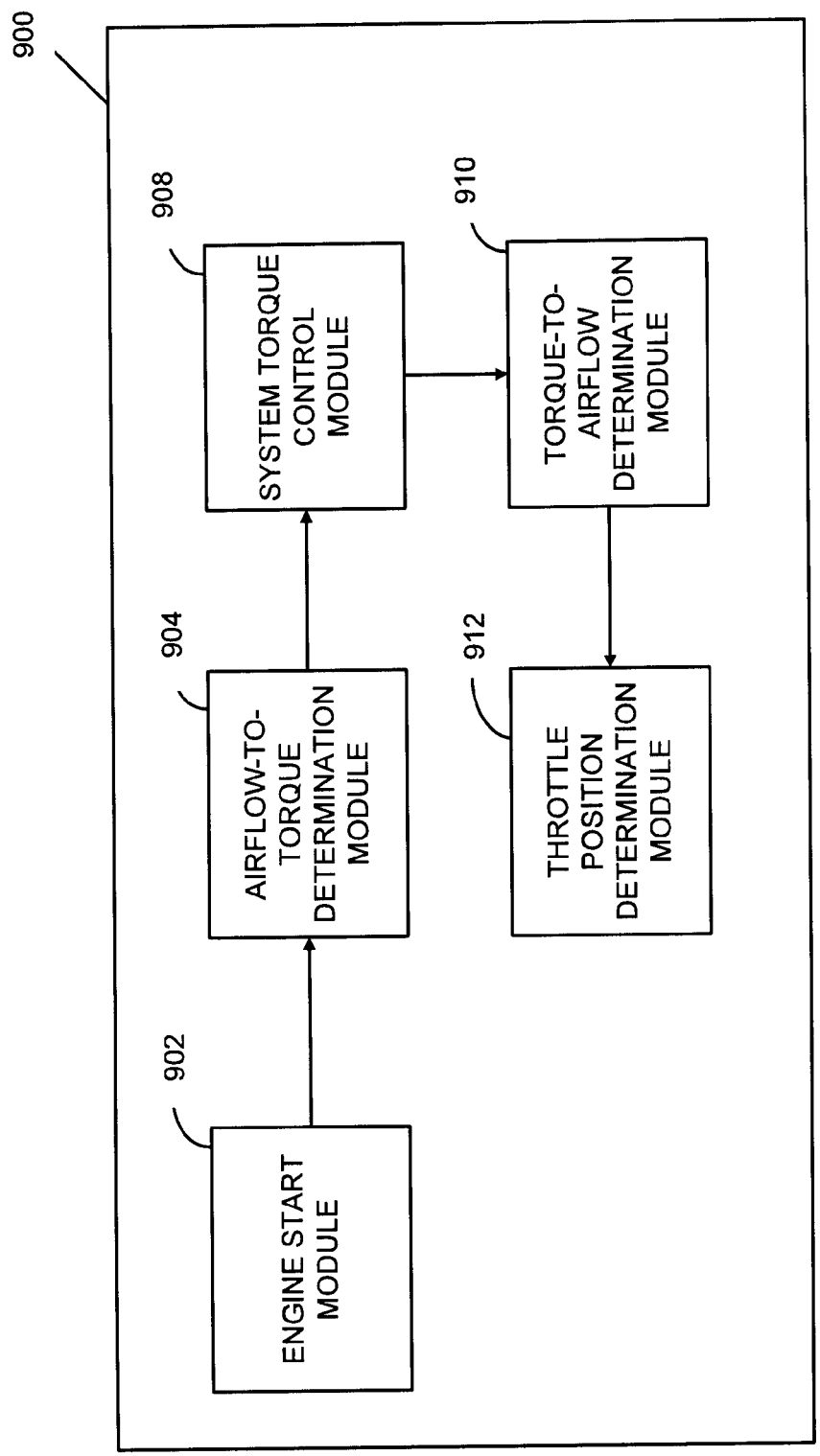
FIG. 12 is a functional block diagram illustrating throttle position control in accordance with an embodiment of the present disclosure.

Referring now to FIG. 12, a functional block diagram illustrating throttle position control is shown. With reference to FIG. 1, the main control module 51, the ECM 54, and/or the HCM 56 (designated as 900) may include an engine start module 902, an air flow-to-torque determination module 904, a system torque control module 906, a torque-to-air flow determination module (which may include the inverse solution of air flow-to-torque determination module 908, and a throttle position determination module 910.

The engine start module 902 may be in communication with the air flow-to-torque determination module 904 and may provide a signal thereto indicative of an initial desired air flow value ($MAF_{DES\_i}$) for an engine start condition. The engine start module 902 may determine $MAF_{DES\_i}$ based on a series of parameters including engine coolant temperature, engine run time, and barometric pressure, as discussed below.

The engine start module 902 may determine $MAF_{DES\_i}$ at predetermined time steps throughout engine cranking at startup. When an engine transitions from cranking to idle, the engine start module 902 may provide a signal to the air flow-to-torque determination module 904 indicative of a current $MAF_{DES\_i}$.

The air flow-to-torque determination module 904 may be in communication with the system torque control module 906 and may provide a signal thereto indicative of a minimum torque level ($T_{MIN}$) for the engine based on $MAF_{DES\_i}$ from the engine start module 902. The air flow-to-torque determination module 904 may determine the minimum torque level $T_{MIN}$ value corresponding to $MAF_{DES\_i}$ through a calculation. $MAF_{DES\_i}$ may be converted to an air-per-cylinder (APC) value and passed to the calculation. The calculation may include a torque model, such as an APC torque model as disclosed in U.S. Provisional Patent Application Ser. No. 60/861,494, the disclosure of which is expressly incorporated herein by reference.

The minimum torque level $T_{MIN}$ is provided to the system torque control module 906 may be used as a minimum torque level for operation of the engine during vehicle operation. More specifically, $T_{MIN}$ may be used for torque regulation of the engine. System torque control module 906 may set a minimum torque level for engine idle control. System torque control module 906 may further include a torque arbitration system, such as the system disclosed in U.S. patent application Ser. No. 11/712,597, the disclosure of which is expressly incorporated herein by reference. System torque control module 906 may generally control vehicle torque requests based on the minimum torque level needed to prevent undesirable conditions such as engine stall or misfire.

An adjusted torque level ($T_{ADJ}$) from the system torque control module 906 may then be passed to the torque-to-air flow determination module 908. The adjusted torque level $T_{ADJ}$ provided by the system torque control module 906 may be generally similar to $T_{MIN}$ provided by the air flow-to-torque determination module 904. However, the system torque control module 906 may additionally account for driver torque requests. For example, the position of an accelerator pedal may be provided to the system torque control module 906 by an accelerator pedal sensor. For a key start, when the accelerator position is zero then the adjusted torque level $T_{ADJ}$ is equal to $T_{MIN}$. For an auto start, adjustment in torque may not be performed and startability $T_{MIN}$ is provided to the torque-to-air flow determination module 908.

During the determination of $MAF_{DES\_i}$ from the engine start module 902, the accelerator pedal position may be initialized to a zero position corresponding to non-actuated accelerator pedal. Initialization of accelerator pedal position may generally provide for elimination of a "dead pedal" condition. A "dead pedal" condition may generally be characterized as a displacement of an accelerator pedal without a corresponding increase in throttle opening. As such, the zero pedal position may correspond to a position of a throttle corresponding to $T_{ADJ}$ with the accelerator pedal in a non-actuated position. Therefore, if a user steps into the accelerator pedal, a torque request is generated at the system torque control module 906. This request is passed on to the torque-to-air flow determination module 908 where a final desired engine air flow ($MAF_{DES\_f}$) is determined.

$MAF_{DES\_f}$ may be determined in a manner similar to that described above regarding the $T_{MIN}$ determination at the air flow-to-torque determination module 904. The calculation may include a torque model, such as an inverse APC torque model as disclosed in U.S. Provisional Patent Application Ser. No. 60/861,494. As indicated above, the $MAF_{DES\_f}$ determined by the torque-to-air flow determination module 908 may generally be equal to $MAF_{DES\_i}$ from the engine start module 902 adjusted by any further torque requests from the system torque control module 906. $MAF_{DES\_f}$ may then be used to adjust a throttle area for engine starting.

More specifically, the torque-to-air flow determination module 908 may provide a signal to the throttle position determination module 910 indicative of $MAF_{DES\_f}$. The throttle position determination module 910 may determine the desired throttle area ($A_{THRDES}$) associated with $MAF_{DES\_f}$. $A_{THRDES}$ may be determined based on a flow density associated with atmospheric conditions and $MAF_{DES\_f}$. As such, varying atmospheric conditions are automatically accounted for. $A_{THRDES}$ may be determined as follows:

$$A_{THRDES} = \frac{MAF_{DES\_f} * \sqrt{R * IAT}}{P_{BARO} * \Phi\left(\frac{MAP}{P_{BARO}}\right)}$$

R is the universal gas constant and $\phi$ is based on $P_R$ in accordance with the following relationships:

$$\Phi = \begin{cases} \sqrt{\frac{2\gamma}{\gamma-1}\left(1-P_R^{\frac{\gamma-1}{\gamma}}\right)} & \text{if } P_R > P_{critical} = \left(\frac{2}{\gamma+1}\right)^{\frac{\gamma}{\gamma-1}} = 0.528 \\ \sqrt{\gamma \frac{2^{\frac{\gamma+1}{(\gamma-1)}}}{\gamma+1}} & \text{if } P_R \leq P_{critical} \end{cases}$$

$P_R$ is generally determined as the ratio between MAP and $P_{BARO}$. $P_{BARO}$ can be directly measured with a barometric pressure sensor or may be calculated using other known parameters. $P_{CRITICAL}$ is defined as the pressure ratio at which the velocity of the air flowing past the throttle equals the velocity of sound. This condition is called choked or critical flow. The critical pressure ratio is determined by:

$$P_{CRITICAL} = \left(\frac{2}{\gamma+1}\right)^{\frac{\gamma}{\gamma-1}}$$

$\gamma$ is equal to the ratio of specific heat for air and may range from about 1.3 to about 1.4. As such, the present disclosure provides for accurate torque control under varying environmental conditions by consideration the pressure ratio $P_R$.

Referring now also to FIG. 14, a method of determining throttle area is shown. The method depicts control logic for an air flow-based crank throttle control system. The method determines an air flow rate to provide a stable start-up and idle condition for engine. The air flow rate may be used to set minimum torque levels for engine operation, as well as a throttle area for engine start. The method may begin at step 920.

In step 922, engine operating parameters are determined. Engine operating parameters may include engine coolant temperature, engine run time, and barometric pressure. In step 924, initial desired engine air flow $MAF_{DES\_i}$ is determined.

The initial desired engine air flow $MAF_{DES\_i}$ may be determined based on a predetermined lookup table as a function of the determined engine operating parameters. The initial desired engine air flow $MAF_{DES\_i}$ may generally be associated with an air flow that is desirable for an engine cranking or start condition.

In step 926, a torque value is determined. The torque value may be determined based on the initial desired engine air flow $MAF_{DES\_i}$. The torque value may be determined as indicated above regarding the air flow-to-torque determination module 904.

In step 928, a system torque minimum ($T_{MIN}$) may be set. The system torque minimum $T_{MIN}$ may be set as indicated above regarding system torque control module 906. Additional torque requests may be accounted for from a user, such as accelerator pedal actuation. The torque value of step 926 may be modified based on additional user torque requests to generate an adjusted torque request ($T_{ADJ}$).

In step 930, a final desired air flow ($MAF_{DES\_f}$) is determined based on the adjusted torque request $T_{ADJ}$. The final desired air flow $MAF_{DES\_f}$ may be determined using the inverse torque calculation, as indicated above regarding the torque-to-air flow determination module 908.

In step 932, a desired throttle area ($A_{THRDES}$) is determined. The desired throttle area $A_{THRDES}$ may be determined based on the final desired air flow $MAF_{DES\_f}$ and as indicated above regarding the throttle position determination module 910. As indicated above, the desired throttle area $A_{THRDES}$ may account for intake air temperature, barometric pressure relative to MAP, as well as the final desired air flow $MAF_{DES\_f}$.

In step 934, engine operation is evaluated. When the engine is still operating in a starting mode, control returns to step 922. The engine may transition to an idle condition after completion of the starting mode. When the engine is no longer in the starting mode (i.e., the engine has transitioned to the idle condition), control may end at step 936. The last values generated for system torque minimums, desired air flow, and desired throttle area by steps 926, 930, and 932, respectively may be used for transitioning from the engine starting mode to an engine idle mode.

The above-described steps are meant to be illustrative examples; the steps may be performed sequentially, synchronously, simultaneously, continuously, during overlapping time periods or in a different order depending upon the application.

The above embodiments allow a vehicle to provide a similar performance response for auto start tip-in events as for non-auto start tip-in events. In other words, similar vehicle response is provided when at idle and a vehicle operator actuates an accelerator regardless of whether the vehicle is in an auto start mode or in a non-auto start mode. The above embodiments provide auto starts without engine speed sags or flares. The above embodiments provide a smooth ramp up of engine speed and appropriate torque response for normal, backup and aggressive modes. The above embodiments also minimize emissions generated during an auto start by maintaining normal fuel, spark operating ranges. Strong hybrid startability system reuse is provided.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating an engine control system comprising:
   receiving an auto start command signal;
   reducing pressures within cylinders of an engine based on the auto start command signal comprising:
   receiving a torque request signal corresponding to at least one of spark and fuel;
   calculating a powertrain output torque based on engine air flow commands of an engine control module; and
   controlling air flow to the engine based on the powertrain output torque; and
   during a startup of the engine:
   increasing electric motor torque to a first predetermined level to overcome friction and pumping pressures of the engine;
   reducing electric motor torque to ramp up a current speed of the engine and to engage a transmission;
   activating and increasing combustion torque of the engine after the current speed of the engine is within a predetermined range of an idle speed and after a manifold absolute pressure of the engine is less than a second predetermined level;
   generating a crankshaft output torque signal subsequent to the reducing of the electric motor torque; and
   increasing the electric motor torque based on the crankshaft output torque signal to increase a crankshaft output torque of the engine subsequent to the reducing of the electric motor torque and while performing the activating of the combustion torque of the engine.

2. The method of claim 1 wherein receiving an auto start command signal comprises at least one of receiving a brake signal, receiving an accelerator signal, receiving an air conditioning activation signal, and receiving a regeneration signal.

3. The method of claim 1 wherein reducing pressures within the cylinders of the engine comprises increasing the electric motor torque to increase the current speed.

4. The method of claim 1 wherein:
   fuel to the engine is enabled when the current speed of the engine is greater than or equal to a third predetermined level and based on an accelerator pedal position;
   fuel to the engine is enabled in a normal mode when the manifold absolute pressure of the engine is less than a fourth predetermined level; and
   fuel to the engine is enabled in an aggressive mode when the transmission is engaged based on speed of the engine.

5. The method of claim 1 wherein fuel to the engine is enabled when the engine is activated.

6. The method of claim 1 further comprising transferring control of the current speed from a hybrid control module to the engine control module when at least one of the combustion torque is activated and greater than a third predetermined level and the current speed is greater than or equal to an idle speed.

7. The method of claim 1 wherein air flow to the engine is controlled by the engine control module,
   wherein the engine control module pumps down the manifold absolute pressure by adjusting air flow across a throttle to a predetermined air flow level, and then
   wherein the engine control module adjusts the air flow across the throttle to provide a requested torque output.

8. The method of claim 1 further comprising increasing combustion torque of the engine to reduce the electric motor torque to zero when control of the current speed of the engine is transferred from a hybrid control module to the engine control module.

9. The method of claim 1 further comprising transferring control of the current speed of the engine after activation of the combustion torque of the engine,
   wherein when control of the current speed of the engine is transferred from a hybrid control module to the engine control module a closed loop error of the hybrid control module is maintained at a constant level and is transmitted to the engine control module.

10. The method of claim 1 further comprising wherein the engine control module switches from an idle speed control mode that is controlled by a hybrid control module to a driver torque request mode that is controlled by the engine control module based on an accelerator signal.

11. The method of claim 10 wherein the engine control module controls electric motor torque based on a difference between a crankshaft torque and a WOM torque, where WOM torque is combustion torque of the engine minus brake torque without electric motor torque applied.

12. The method of claim 1 further comprising:
operating the engine control module in a first mode and a second mode;
generating a transmission load signal based on the idle speed;
increasing the electric motor torque to increase the current speed based on the idle speed and the transmission load signal via a hybrid control module during the first mode;
controlling the current speed via the engine control module when in the second mode; and
transferring control of the current speed from the hybrid control module to the engine control module when at least one of the current speed matches the idle speed and a combustion torque output of the engine is equal to a requested crankshaft output torque.

13. The method of claim 12 further comprising:
generating a brake signal;
operating the engine control module and the hybrid control module in the first mode; and
determining the idle speed and generating the transmission load signal based on the brake signal via the engine control module.

14. The method of claim 12 further comprising:
generating an accelerator signal; and
transferring control of the current speed from the hybrid control module to the engine control module (i) before the combustion torque output is equal to the requested crankshaft output torque and (ii) before the current speed is greater than or equal to the idle speed based on the accelerator signal.

15. The method of claim 12 further comprising controlling throttle position of the engine via the engine control module based on at least one of a cranking cylinder event and a coolant temperature.

16. The method of claim 12 further comprising reducing throttle area when in the first mode via the engine control module to reduce pressures in cylinders of the engine.

17. The method of claim 12 further comprising adjusting a torque request corresponding to at least one of spark and fuel via the hybrid control module when in the first mode.

18. The method of claim 12 further comprising advancing spark timing via the engine control module when in the second mode based on a torque request.

19. The method of claim 12 further comprising:
estimating torque output of the engine via the engine control module; and
controlling the electric motor torque based on the estimated torque output via the hybrid control module.

20. The method of claim 12 further comprising ramping the combustion torque from a friction torque level of the engine to an idle speed torque level that corresponds with a steady state transmission load via the engine control module based on the torque request signal from the hybrid control module.

21. The method of claim 1, further comprising:
decreasing the electric motor torque subsequent to the increasing of the electric motor torque based on the crankshaft output torque signal; and
increasing a combustion torque request while performing the activating and increasing of the combustion torque of the engine.

22. A method of operating an engine control system comprising:
receiving an auto start command signal;
reducing pressures within cylinders of an engine based on the auto start command signal comprising:
receiving a torque request signal corresponding to at least one of spark and fuel;
calculating a powertrain output torque based on engine air flow commands of an engine control module; and
controlling air flow to the engine based on the powertrain output torque;
increasing electric motor torque to a first predetermined level to overcome friction and pumping pressures of the engine;
reducing electric motor torque to ramp up a current speed of the engine and to engage a transmission;
activating and increasing combustion torque of the engine after the current speed of the engine is within a predetermined range of an idle speed and after a manifold absolute pressure of the engine is less than a second predetermined level; and
transferring control of the current speed from a hybrid control module to the engine control module when at least one of the combustion torque is activated and the current speed is greater than or equal to the idle speed.

23. The method of claim 22, further comprising:
controlling the current speed of the engine via the hybrid control module by adjusting the electric motor torque when in a first mode; and
controlling the current speed of the engine via the engine control module by adjusting a WOM torque when in a second mode, where the WOM torque is a combustion torque of the engine minus brake torque without electric motor torque applied.

24. The method of claim 22, further comprising:
determining an electric motor torque error;
transmitting the electric motor torque error from the hybrid control module to the engine control module during the transfer of control of the current speed from the hybrid control module to the engine control module; and
adjusting the electric motor torque error via the engine control module.

* * * * *